(12) United States Patent
Peter et al.

(10) Patent No.: US 12,178,149 B2
(45) Date of Patent: Dec. 31, 2024

(54) HEADLAND GUIDANCE TRACKS FOR FARM MACHINERY

(71) Applicant: DEERE & COMPANY, Moline, IL (US)

(72) Inventors: Gregory L. Peter, Raleigh, NC (US); David A. Johnson, Durham, NC (US); Jeffrey S. Puhalla, Moorhead, MN (US); Daniel R. Smith, Ankeny, IA (US); Heather R. Bradford, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 273 days.

(21) Appl. No.: 17/731,015

(22) Filed: Apr. 27, 2022

(65) Prior Publication Data

US 2023/0345855 A1    Nov. 2, 2023

(51) Int. Cl.
*A01B 69/04*  (2006.01)
*G05D 1/00*  (2024.01)

(52) U.S. Cl.
CPC ......... *A01B 69/008* (2013.01); *G05D 1/0044* (2013.01); *G05D 1/0219* (2013.01); *G05D 1/0278* (2013.01)

(58) Field of Classification Search
CPC .. A01B 69/008; A01B 79/005; G05D 1/0044; G05D 1/0219; G05D 1/0278; G05D 1/648; G05D 2105/15; G05D 2107/21; G05D 2109/10; A01D 41/1278
See application file for complete search history.

(56) References Cited

U.S. PATENT DOCUMENTS

| | | | |
|---|---|---|---|
| 8,983,767 B2 | 3/2015 | Pieper et al. | |
| 9,795,074 B2 * | 10/2017 | Stratton | A01B 79/005 |
| 10,251,329 B2 * | 4/2019 | Foster | G05D 1/0219 |

(Continued)

FOREIGN PATENT DOCUMENTS

| | | |
|---|---|---|
| EP | 1839479 A1 | 10/2007 |
| EP | 1847897 B1 | 1/2014 |
| WO | 2012016752 A1 | 2/2012 |

OTHER PUBLICATIONS

Extended European Search Report and Written Opinion issued in European Patent Application No. 23164162.2, dated Feb. 7, 2024, in 08 pages.

*Primary Examiner* — Rami Khatib
(74) *Attorney, Agent, or Firm* — Michael Best & Friedrich LLP

(57) ABSTRACT

System and methods for generating a work plan for a headland of an agricultural field (e.g., the portion of the agricultural field that is used by an agricultural machine to perform edge turns while working a main work partition of the field). A field boundary polygon indicative of a workable area of the agricultural field is segmented into multiple segments including a headland polygon and a work partition polygon. A seed track is generated based on a shape of a portion of the boundary of the headland polygon that is shared in common with the boundary of the field boundary polygon. The work plan is generated by replicating the seed track at a defined spacing throughout the headland polygon. In some implementations, the agricultural machine is operated autonomously or semi-autonomously to work the headland area based on the defined work plan.

21 Claims, 11 Drawing Sheets

(56) References Cited

U.S. PATENT DOCUMENTS

| | | |
|---|---|---|
| 10,820,477 B2 | 11/2020 | Dix |
| 2007/0233348 A1* | 10/2007 | Diekhans ............ A01D 41/1278 |
| | | 701/50 |
| 2007/0282523 A1* | 12/2007 | Diekhans ............. A01B 69/007 |
| | | 701/50 |
| 2008/0103690 A1* | 5/2008 | Dix ..................... A01B 69/008 |
| | | 701/50 |
| 2008/0249692 A1* | 10/2008 | Dix ..................... A01B 69/008 |
| | | 701/50 |
| 2011/0112730 A1* | 5/2011 | Rekow ................. G05D 1/0219 |
| | | 701/50 |
| 2014/0081568 A1 | 3/2014 | Pieper et al. |
| 2016/0174459 A1* | 6/2016 | Balutis ................ G05D 1/0234 |
| | | 701/25 |
| 2018/0156622 A1* | 6/2018 | Mouthaan ............ G05D 1/0274 |
| 2019/0129433 A1* | 5/2019 | Xiao ................... G05D 1/0274 |
| 2019/0216003 A1* | 7/2019 | Green ................. A01B 79/005 |
| 2019/0239416 A1 | 8/2019 | Green et al. |
| 2020/0296878 A1 | 9/2020 | Dix |
| 2021/0188333 A1* | 6/2021 | Angel ................. B61L 15/0072 |
| 2021/0267115 A1* | 9/2021 | Fjelstad ............... G05D 1/0248 |
| 2023/0119306 A1* | 4/2023 | Burnley ............... G05D 1/0212 |
| | | 701/23 |

\* cited by examiner

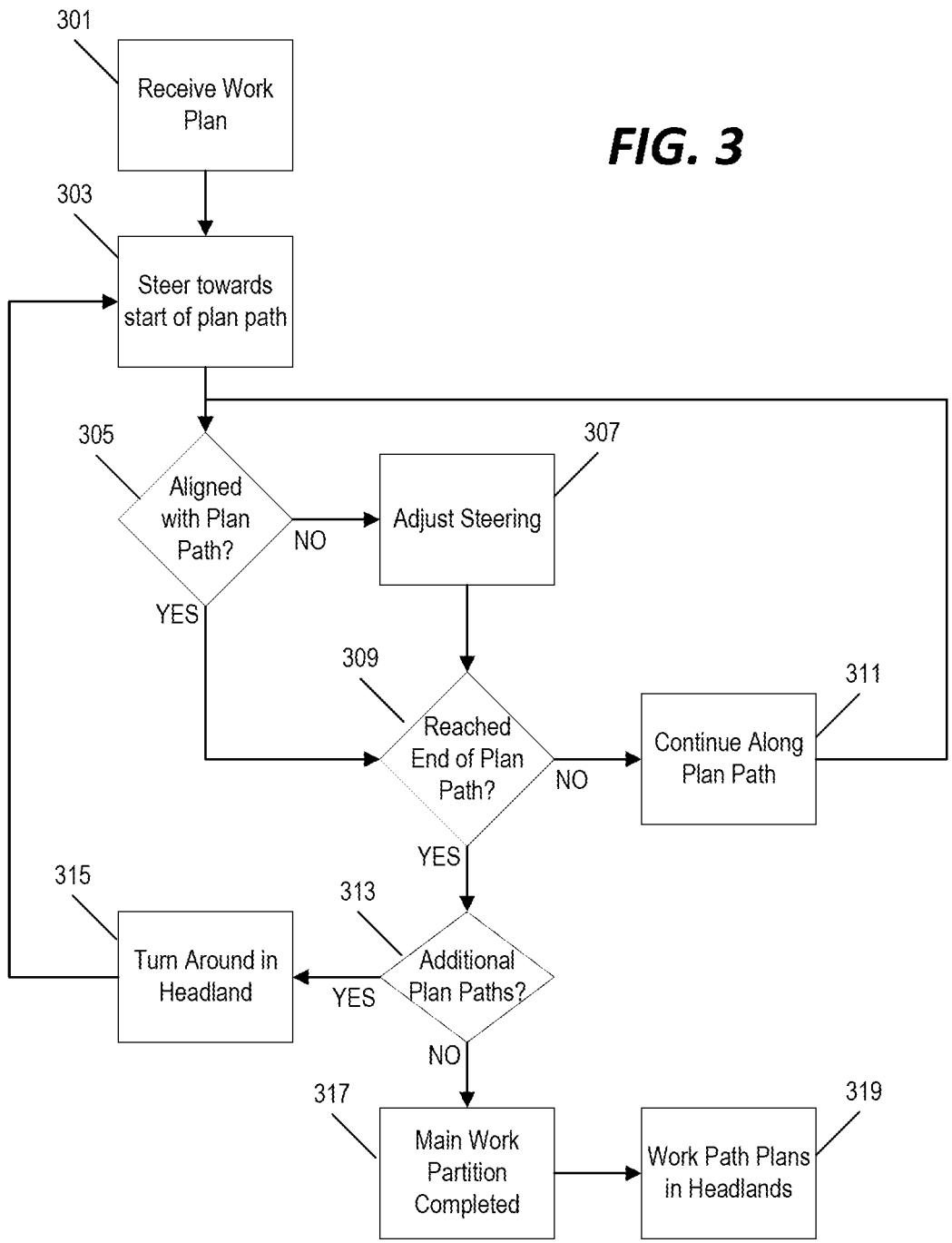

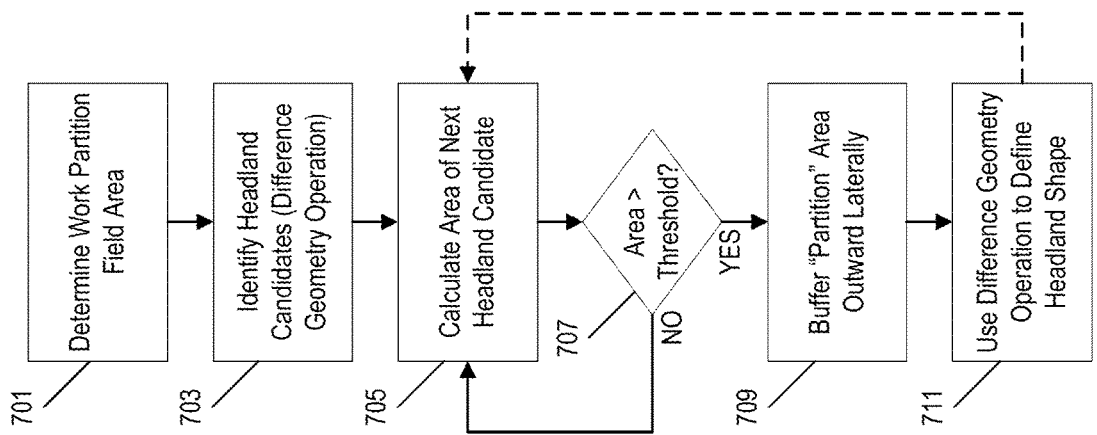
FIG. 7
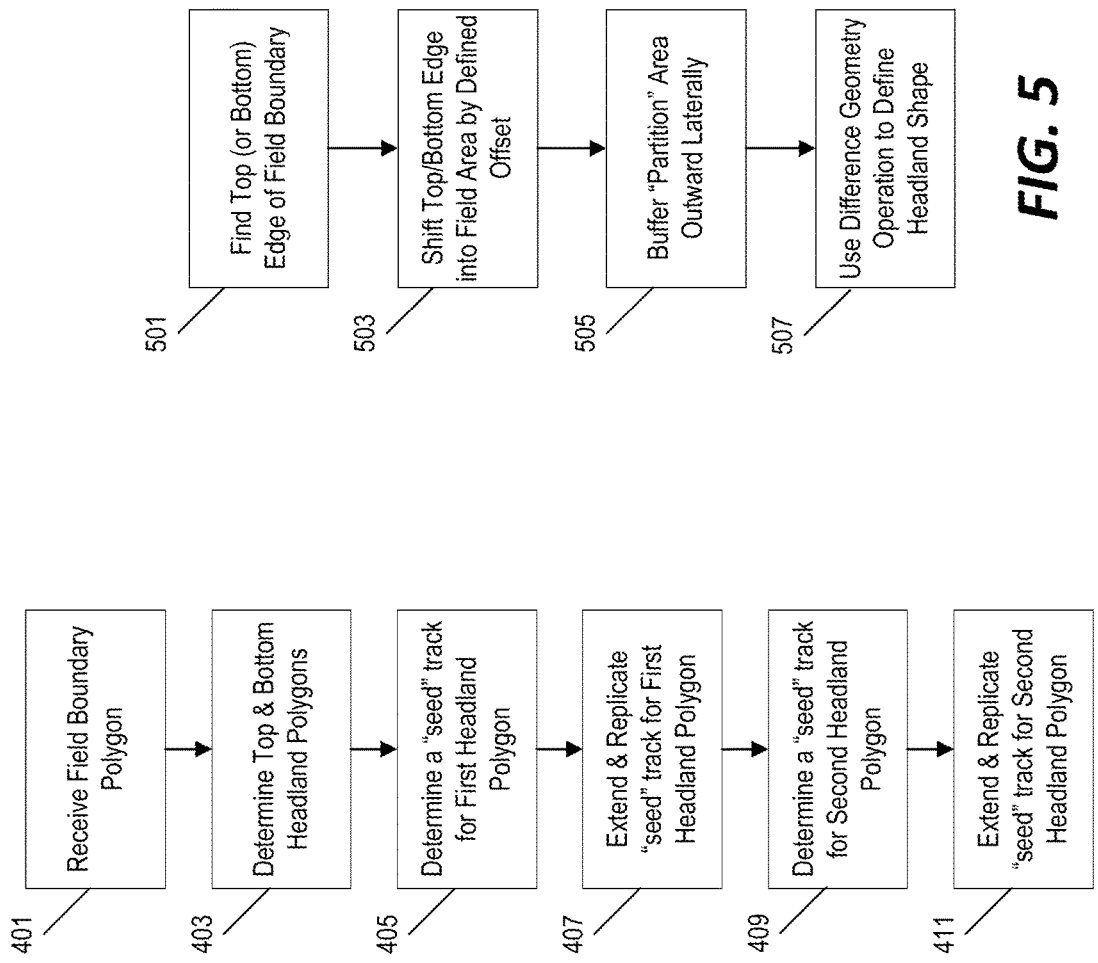
FIG. 5
FIG. 4

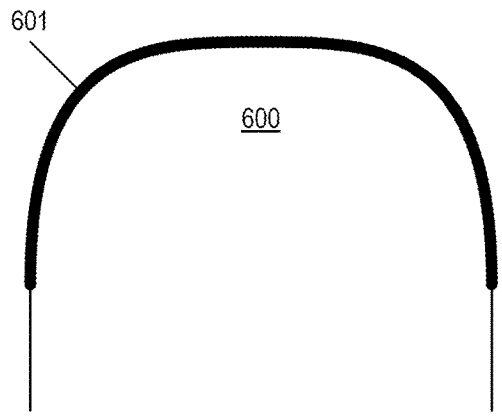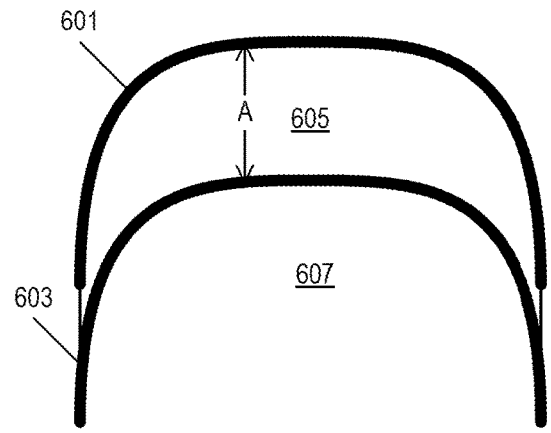
*FIG. 6A*  *FIG. 6B*
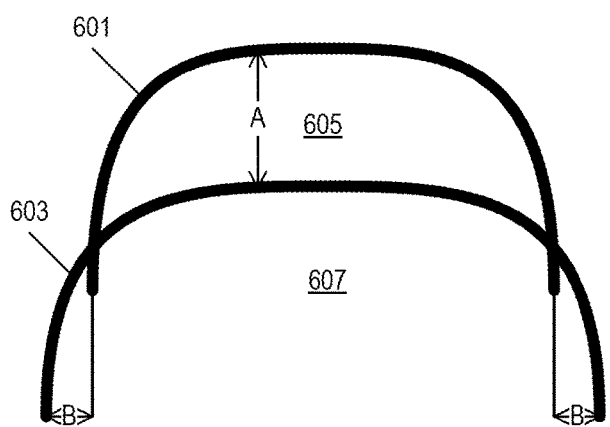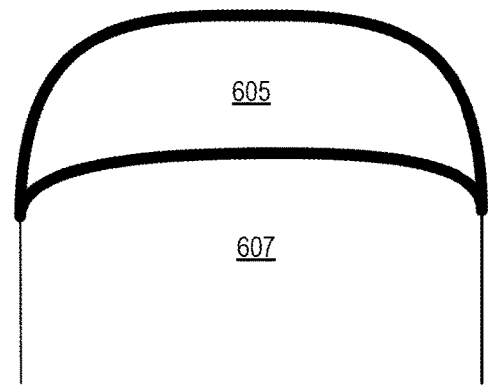
*FIG. 6C*  *FIG. 6D*

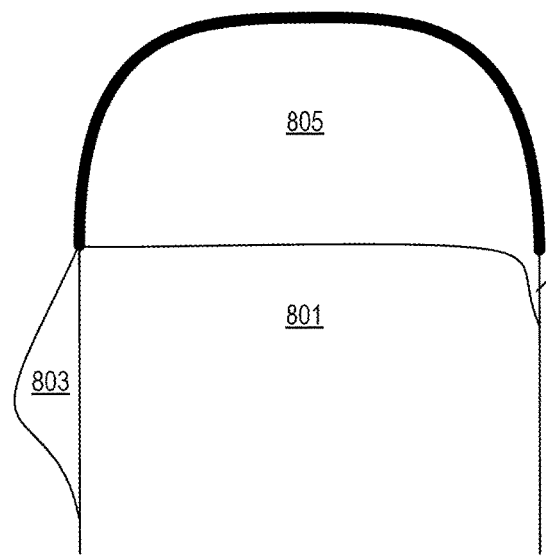 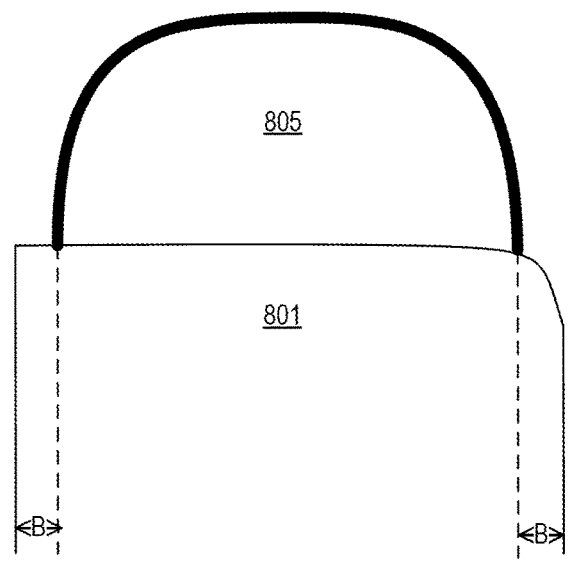
FIG. 8A  FIG. 8B
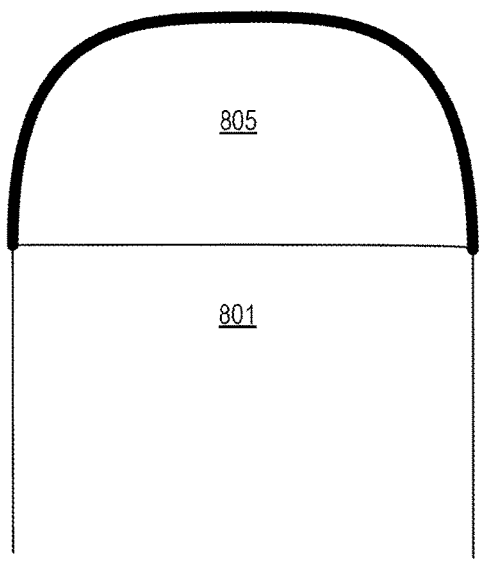
FIG. 8C

HEADLAND GUIDANCE TRACKS FOR FARM MACHINERY

BACKGROUND

The present invention relates to systems and methods for operating farm machinery to work a farm field. For example, some of the systems and methods described herein relate to farm machinery configured to autonomously or semi-autonomously work a farm field by performing a task across a surface of the farm field.

SUMMARY

In one embodiment, the invention provides a system configured to generate a work plan for a headland of an agricultural field (e.g., the portion of the agricultural field that is adjacent to a work partition of the field and is used by an agricultural machine to perform edge turns while performing a work task in the work partition). A field boundary polygon, which is indicative of a workable area of the agricultural field, is segmented into multiple segments including a headland polygon and a work partition polygon. The system includes an electronic controller configured to identify a segment of a boundary of the headland polygon that is shared in common with a field edge boundary of the field boundary polygon. The electronic controller generates a seed track based on a shape of at least a portion of the identified segment and defines a plurality of guidance tracks for the headland by replicating the seed track at a defined spacing throughout the headland polygon. The guidance tracks are each indicative of a path to be followed by the agricultural machine while performing the work task in the headland of the agricultural field.

In another embodiment, the invention provides a method of generating a work plan for a headland of an agricultural field. A field boundary polygon, which is indicative of a workable area of the agricultural field, is segmented into a plurality of segments including a headland polygon and a work partition polygon. A segment of the boundary of the headland polygon is identified that is shared in common with a field edge boundary of the field boundary polygon. A seed track is generated based on a shape of at least a portion of the identified segment and a plurality of guidance tracks for the headland are defined by replicating the seed track at defined spacings through the headland polygon. Each guidance track is indicative of a path to be followed by the agricultural machine while performing the work task in the headland of the agricultural field.

In yet another embodiment, the invention provides a system for operating an agricultural machine to perform a work task on an agricultural field. The system includes one or more electronic controllers configured to determine a field boundary polygon indicative of a workable area of the agricultural field and to segment the field boundary polygon into a plurality of work area polygons including a work partition polygon, a top headland polygon, and a bottom headland polygon. The one or more electronic controllers define a work plan for the work partition polygon, the top headland polygon, and the bottom headland polygon, each including a plurality of guidance tracks indicating paths to be followed by the agricultural machine while performing the work task in each respective field area. The one or more electronic controllers are configured to define the work plan for the top headland polygon by identifying a segment of the boundary of the top headland polygon that includes an entire portion of the boundary of the top headland polygon that is shared in common with a field edge boundary of the field boundary polygon. A top headland seed track is generated by the one or more electronic controllers by trimming the segment of the boundary of the top headland polygon on both ends based on a defined lateral trim buffer width and extending the trimmed seed track on both ends such that a total lateral width of the extended seed track exceeds a maximum width of the top headland polygon. The plurality of top headland guidance tracks are then defined by the one or more electronic controllers by replicating the extended top headland seed track at a defined spacing through the top headland polygon and trimming any portions of the replicated seed tracks that extend beyond the boundary of the top headland polygon. After generating work plans for the various different work areas of the agricultural field, the one or more electronic controllers operate the agricultural machine by transmitting control signals to a steering system of the agricultural machine to cause the agricultural machine to follow the defined guidance tracks according to the work plan for each work area of the agricultural field.

Other aspects of the invention will become apparent by consideration of the detailed description and accompanying drawings.

BRIEF DESCRIPTION OF THE DRAWINGS

FIG. 3 is a flowchart of a method of working the agricultural field according to a defined work plan using the control system of FIG. 1.

FIG. 4 is a flowchart of a method for automatically generating a work plan for the field area of the top and bottom headlands of an agricultural field using the control system of FIG. 1.

FIG. 5 is a flowchart of a first method for defining the geometric area of a top or bottom headland executed as part of the method of FIG. 4.

FIGS. 6A through 6D are schematic overhead views of an agricultural field demonstrating the process of determining the geometric area of a top headland according to the method of FIG. 5.

FIG. 7 is a flowchart of a second method for defining the geometric area of the top or bottom headland executed as part of the method of FIG. 4.

FIGS. 8A through 8C are schematic overhead views of an agricultural field demonstrating the process of determining the geometric area of a top headland according to the method of FIG. 7.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
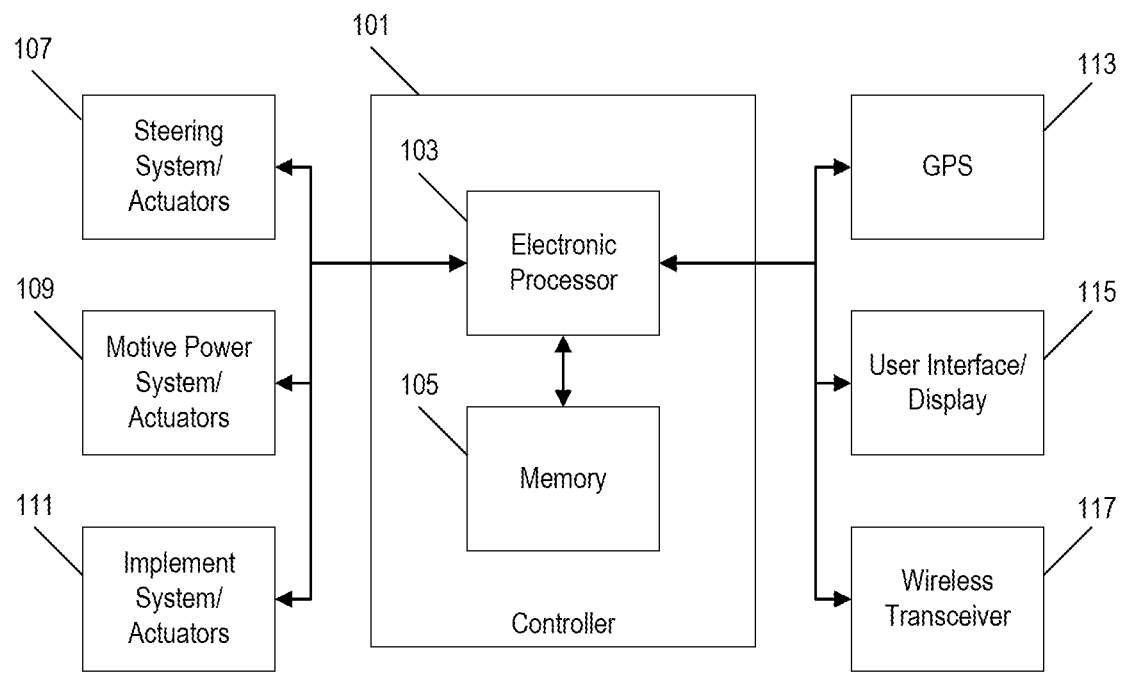
FIG. 1 is a block diagram of a control system for an agricultural work machine according to one implementation.

FIG. 1 illustrates an example of a control system for an agricultural machine such as, for example, a harvester or a planter. A controller 101 includes an electronic processor 103 and a non-transitory, computer-readable memory 105. The memory 105 stores data and computer-executable instructions. The electronic processor 103 is communicatively coupled to the memory 105 to access stored data and to store new data to the memory 105. The electronic processor 103 is also configured to access and execute the instructions from the memory 105 in order to provide the functionality of the controller 101 including, for example, the functionality described herein.

The controller 101 is communicatively coupled to various actuators and sub-systems of the agricultural machine including, for example, the steering system/actuators 107, the motive power system/actuators 109, and the implement system/actuators 111. The steering system/actuators 107 control the steering of the agricultural machine. The motive power system/actuators 109 control the drivetrain of the agricultural machine and regulate, for example, the speed at which the agricultural machine moves. The implement system/actuators 111 control the operation of one or more implements of the agricultural machine including, for example, controlling the height/operation of a header to control the harvesting of crops from the agricultural field (e.g., in implementations where the agricultural machine is a harvester) or controlling the mechanisms for dispensing seeds in the agricultural field (i.e., in implementations where the agricultural machine is a planter).

The controller 101 in this example is also communicatively coupled to a global positioning system (GPS) 113, a user interface/display 115, and a wireless transceiver 117. The controller 101 is configured to interact with the GPS 113 to determine a geospatial location of the agricultural machine during operation. The controller 101 is configured to interact with the user interface/display 115 to display operational information to an operator and, in some implementations, to provide a graphical user interface through which the operator is able to control various aspects of the operation of the agricultural machine. The controller 101 is configured to interact with the wireless transceiver 117 to facilitate wireless communication between the controller 101 and one or more other remote systems including, for example, other agricultural machines and/or remote computer systems for controlling/regulating the operation of the agricultural machine and the work performed by the agricultural machine.

In various implementations, the control system of FIG. 1 may be configured to facilitate autonomous, semi-autonomous, or manual operation of the agricultural machine. For example, in some implementations, the user interface 115 may include a joystick and/or other user-operable controls and, under manual operation, the controller 101 may be configured to receive user control inputs from an operator of the agricultural machine through these user-operable controls of the user interface 115 and to then generate and transmit control signals to the various different machine systems/actuators 107, 109, 111. In this way, the steering/motive power of the agricultural machine and/or the operation of the machine implements are operated based on the manual inputs received from the operator. Conversely, under autonomous operation, the controller 101 may be configured to automatically control the steering/motive power of the agricultural machine and the operation of the machine implements according to a defined work plan (as discussed further below) and/or based on input data from various machine sensors. Under semi-autonomous operation, the controller 101 may be configured to control operation of the agricultural machine based on a combination of user inputs and automatically controlled operations.

Figure 2:
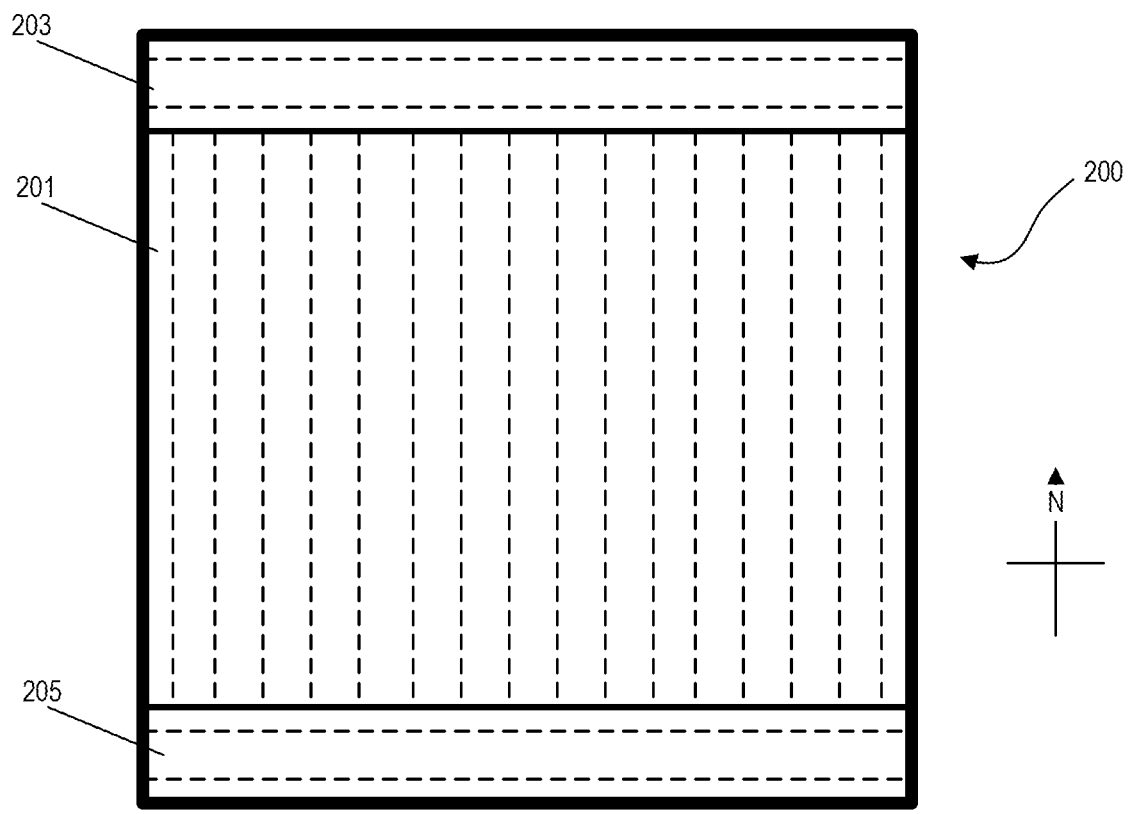
FIG. 2 is a schematic overhead view of an example of a work plan for an agricultural field to be worked by an agricultural work machine using the control system of FIG. 1.

FIG. 2 illustrates an example of a work plan 200 for an agricultural field for use by the control system of FIG. 1. In the example of FIG. 2, the work plan 200 includes a series of guidance tracks (indicated by the dashed lines in FIG. 2) to be followed by the agricultural machine while working a particular agricultural field (e.g., planting, harvesting, etc.). The work plan 200 is designed for the specific field based on the known and/or determined geometry of the agricultural field. The works areas of the agricultural field are segmented into sub-zones with different guidance objectives. In this example, the agricultural field is segmented into a work partition 201, a top headland 203, and a bottom headland 205. The guidance tracks for the work partition 201 are defined according to a simplified guidance track pattern including straight tracks defined according to a particular heading and/or curved tracks defined by a shape of a field edge. Each guidance track in the work partition 201 begins and terminates at or near a respective headland 203, 205. When executing the work plan for the work partition 201, the agricultural machine is operated along each parallel guidance track and, upon reaching the end of a guidance track, the agricultural machine turns around within the area of the headland 203, 205 before beginning to follow the next guidance track in the work partition 201.

Accordingly, the top headland 203 and the bottom headland 205 generally refer to areas on opposite ends of a work partition 201 that are sized to allow for end-turns of the agricultural machine while working the work partition 201. The headlands 203, 205 may be used to maneuver equipment and perform other operations including, for example, tendering and unloading of the agricultural machine. The terms "top headland" and "bottom headland" may be used to refer to headlands that are oriented on the north and south ends of a work partition, respectively. However, unless explicitly noted as such, in the examples herein, the phrases "top headland" and "bottom headland" are used to refer more generally to any headlands positioned at opposite ends of a work partition of an agricultural field. Furthermore, any portion of an agricultural field that is not included within a work partition may be considered a "headland." Finally, although the examples described herein generally include only a single work partition and two headlands, in some implementations, the controller 101 may be configured to segment an agricultural field into multiple work partitions and/or more or fewer than two headlands.

Although the headlands are used to facilitate positioning of the agricultural machine, the field area within the headlands may also be planted/worked in order to maximize the use of available field space. The headlands 203, 205 are often worked either before or after the work partition 201—depending on the operation being performed. For example, during planting, the headlands 203, 205 may be planted after the work partition 201 so that the agricultural machine does not repeatedly drive over planted seeds while planting seeds in the work partition 201 (and making end turns within the headlands 203, 205). Conversely, during harvest, crops may be collected from the headlands 203, 205 before the work partition 201 so that the field space of the headlands 203, 205 is cleared and available for the agricultural machine to perform end-turns while harvesting crops from the work partition 201.

In various implementations, a work plan, such as work plan 200 illustrated in FIG. 2, may be utilized by the control system of FIG. 1 to facilitate operation of an agricultural machine under autonomous, semi-autonomous, or manual control. Under autonomous operation, the controller 101 may be configured to use the work plan to automatically control the operation of the agricultural machine. For example, the controller 101 may be configured to use the GPS 113 to determine the current geospatial position of the agricultural machine and to transmit control signals to the steering system/actuators 107 and to the motive power system/actuators 109 to cause the agricultural machine to move along the guidance tracks defined by the work plan.

Conversely, in some implementations, under manual operation, the controller 101 may be configured to display a graphical representation of the work plan 200 on the user interface/display 115 along with an indication of the current position of the agricultural vehicle (relative to the work plan). In some implementations, the controller 101 may also be further configured to output on the user interface/display 115 a visual indication of the actual work path already covered (i.e., "worked") by the agricultural machine. Additionally or alternatively, in some implementations, the controller 101 may be configured to output notices or instructions to the operator (e.g., via the user interface/display 115) indicating a deviation from the work plan guidance tracks and/or providing, for example, steering instructions for the operator to follow in order to cause the agricultural machine to more closely follow the work plan.

In some implementations, under manual operation, the controller 101 may be configured to utilize the work plan in order to provide guidance and assistance to the operator of the agricultural machine, but the controller 101 might not be configured to automatically cause the agricultural machine to follow the work plan. In contrast, under semi-autonomous operation, the controller 101 may be configured to provide a hybrid of manual control (based on user-provided control inputs to the steering, motive power, and/or implements) and automatic control functionality. For example, in some implementations, the controller 101 under semi-autonomous operation may be configured to detect when the operator of the agricultural machine appears to be attempting to follow a particular guidance track in the work plan (e.g., based on a determined position/heading of the agricultural machine, based on a user-provided selection of a guidance track, etc.) and automatically adjusts the steering of the agricultural machine to ensure greater accuracy in executing the work plan while still allowing the operator some degree of manual control of the movements of the agricultural machine.

FIG. 3 illustrates an example of a method for operating an agricultural machine according to a work plan. In this example, the work plan dictates that the agricultural machine work the work partition 201 before working the headlands 203, 205 (e.g., a planting operation). The controller 101 receives a work plan for the agricultural field (step 301) and the steering system/actuators 107 are operated to move the agricultural machine to the start of a guidance track in the work plan (step 303). As the agricultural machine begins to work the agricultural field along the current guidance track, the controller 101 monitors the geospatial position of the agricultural machine using the GPS 113 and determines whether the position of the agricultural machine is aligned with the current guidance track (step 305). If not, the controller 101 transmits an updated control signal to the a steering system/actuators 107 to adjust the steering of the agricultural machine to align with the current guidance track (step 307). In some implementations, while under autonomous or semi-autonomous operation, the steering adjustment are determined and applied automatically by the controller 101. In other implementations, while under manual control, these steering adjustments are determined and applied based on user inputs (in response to guidance instructions and indications provided to the operator as discussed above).

The controller 101 also monitors the geospatial position of the agricultural machine to determine whether the agricultural machine has reached the end of the current guidance track (step 309). If not, the agricultural machine continues to operate along the current guidance track (step 311) and repeatedly monitors the position of the agricultural machine relative to the guidance track as discussed above. However, once the agricultural machine reaches the end of the current guidance track, the controller 101 consults the work plan to determine whether any additional guidance tracks in the work partition 201 remain unworked (step 313). If so, the agricultural machine is operated to turn around in the headland 203, 205 (step 315)—either manually or autonomously—and steered to approach the start of another guidance track (step 303). In response to determining that all of the guidance tracks in the work plan have been completed (step 313), the controller 101 determines that the working of the work partition 201 has been completed (step 317) and then proceeds to work the guidance tracks defined for the headlands 203, 205 (step 319).

The controller 101 operates the agricultural machine to work the headlands 203, 205 in a manner similar to the control mechanisms discussed above in reference to the work partition 201. For example, under autonomous or semiautonomous control, the controller 101 controls the steering of the agricultural machine to approach the start of a guidance track in the headland 203, 205 and then monitors/adjusts the steering of the agricultural machine to follow the guidance track until the end of the guidance track is reached. At that point, the agricultural machine is turned around and begins working the next guidance track. This is repeated until all guidance tracks within the headland are completed. If additional unworked headlands remain, the process is similarly repeated for the next headland until the entire agricultural field has been worked.

As discussed above, in some implementations, the controller 101 may be configured to display a visual representation of the work plan, the current geospatial position of the agricultural machine relative to the work plan, and/or a visual indication of portions of the work plan that have already been completed (e.g., by color coding guidance tracks and/or portions of guidance tracks that have been completed). In implementations where the controller 101 is operating under manual control, these graphical user interface outputs (and/or other additional or alternative visual or auditory outputs) are provided to the operator as guidance recommendations to enable the operator to better steer the agricultural machine according to the work plan. However, in some implementations, the controller 101 may be configured to display similar graphical outputs to the operator in order to provide information to the operator regarding a status of the operation of the agricultural machine and the task(s) being performed by the agricultural machine.

In some implementations, the controller 101 of the agricultural machine itself is configured to generate the work plan before beginning the work operation in the field. In some other implementations, a remote computer system is configured to generate the work plan and to transmit the work plan to the controller 101 of the agricultural machine (e.g., via wireless transceiver 117). Furthermore, in some implementations, functionality of the controller 101 (e.g., the functionality as described herein above and below) may be distributed between one or more local electronic controllers installed in the agricultural machine and/or one or more remote electronic controllers (e.g., a remote computer server configured to control or support control of the agricultural machine). Accordingly, in some implementations, a local electronic controller (e.g., controller 101) and a remote computer system may be configured to work in coordination to design and implement a work plan. Finally, in some implementations, the system may be configured to monitor the work plan and the operation of the agricultural machine and to make updates/modifications to the work plan while the original workplan is being executed based, for example, on observed field conditions and/or detected deviations from the original work plan.

FIG. 4 illustrates an example of a method for generating a work plan for the headlands of an agricultural field executed, for example, by the controller 101 of the agricultural machine. First, the controller 101 receives a field boundary polygon of the agricultural field (step 401). In some implementations, the field boundary polygon is accessed or derived from a map of the agricultural field (e.g., from property records and/or aerial photographs) and is geospatially registered such that the field boundary polygon indicates not only the shape of the field boundary, but also the geospatial location and orientation of the field boundary. Accordingly, a work plan defined according to the field boundary polygon can be executed and/or monitored by the controller 101 using the GPS 113 (e.g., as discussed above in reference to FIG. 3).

The controller 101 then determines the polygons for the top & bottom headlands (step 403). In some implementations, the polygons for the top & bottom headlands are pre-defined (e.g., by a user). However, in some other implementations, the polygons for the top & bottom headlands are dynamically and/or automatically defined by the controller 101. For example, in some implementations, the controller 101 may be configured to define the shape and size of the headlands based on factors such as, for example, a turning radius of the agricultural machine (e.g., how much room is needed in the headlands for the machine to perform an edge turn), a required spacing between guidance tracks (e.g., related to the width of the implement being used by the agricultural machine), etc. Additionally or alternatively, in some implementations, the controller 101 may be configured to define a size and shape of the headlands based, for example, on a width of the working implement to be used so that field area of the headlands can be properly worked by an integer number of guidance tracks.

In some implementations, the controller 101 is configured to define a size and a shape of a headland by identifying a base line of the field boundary polygon (e.g., automatically based on the geometry of the field boundary polygon or based on a user input) and then defines the headland polygon as including all areas of the field boundary polygon that are within a defined headland offset distance of the base line. In other implementations, the work partition polygon is defined before the headland polygon(s) and the controller 101 is configured to define the size and shape of the headland polygon using difference geometry based on portions of the field boundary polygon that are not occupied by the work partition polygon. Further examples of methods performed by the controller 101 in some implementations for determining the top & bottom headland polygons are described below in reference to FIGS. 5 through 8C.

After the agricultural field is segmented into one or more work partitions and one or more headlands, the controller 101 proceeds to generate a work plan (e.g., a series of guidance tracks) for each headland. The controller 101 does this by first determining a "seed" track for a first headland (e.g., the top headland 203 or the bottom headland 205) (step 405). As discussed in further detail below, the seed track may be determined based on a shape of an edge of the headland opposite the edge of the headland that is shared with the work partition. Examples of methods performed by the controller 101 in some implementations for generating a seed track are described below in reference to FIGS. 9 through 12B. A plurality of guidance tracks are then plotted for the headland by replicating the seed track at determined intervals within the headland polygon (step 407). To fill the entire area of the headland polygon, replicated occurrences of the seed track are then extended or "clipped" to cover the entire length of the headland. Examples of methods performed by the controller 101 in some implementations for replicating, extending, and clipping the seed track in order to generate a work plan for the headland are described below in reference to FIGS. 13 through 15B.

After the work plan for the first headland (e.g., top headland 203) is generated, the controller 101 repeats the process for the next headland (e.g., bottom headland 205) by again defining a seed track for the second headland polygon (step 409) and then replicating, extending, and clipping the seed track within the second headland polygon to define a series of guidance tracks (step 411). In some implementations, the system may be configured to segment the agricultural field into more than two headlands (e.g., in some situations based on the work task to be performed and/or the unique shape of the field) and, in some such implementations, the controller 101 is configured to repeat the process described above until work plans have been generated for each headland. Conversely, in some implementations, the controller 101 may be configured to segment the agricultural field in a manner that results in only one headland. For example, in some implementations, the controller 101 may be configured to define a single headland that follows the entire perimeter of the agricultural field and, therefore, surrounds the one or more work partitions. This may be done in order to define a work partition with a more uniform shape (e.g., a rectangular work partition) for an agricultural field with an irregularly shaped boundary. In such cases, the controller 101 would, therefore, be configured to define only a single workplan for the single headland (e.g., a series of guidance tracks encircling the work partition).

In addition to defining a work plan for the headlands of the agricultural field, in some implementations, the controller 101 may be configured to define a work plan for the one or more work partitions (e.g., work partition 201). Although the example of FIG. 4 (and the further examples discussed below) focus primarily on techniques for generating a work plan for the headlands, similar techniques may be used in some implementations to define a work plan for the one or more work partitions. In some implementations, the guidance tracks for the work partition are defined as a series of parallel guidance tracks. The distance between the guidance tracks may be defined, based in part, on the work task to be performed and the particular implement being used to perform the task. For example, in developing a work plan for a harvesting task, the location and position of the guidance tracks and the distance between adjacent guidance tracks will be determined based on factors such as the location/position of the planted crops in the agricultural field and the size/width of the harvesting header that is being used. In some implementations, controller 101 may be configured to utilize straight guidance tracks for the work plan in the work partition 201. In other implementations, the shape of the guidance tracks defined for the work partition may be determined, based at least in part on a geometry of the edge of the work partition (e.g., such that the curve of one or more guidance tracks follows a curve of the edge of the work partition).

In some implementations, the controller 101 is configured to define the geometry of the headlands first and to then define the geometry of the one or more work partitions based on the shape of the headlands and the overall shape of the agricultural field using difference geometry (e.g., the work partition includes the area of the agricultural field polygon that is not occupied by a defined headland). In some other implementations, the controller 101 is configured to determine the geometry of the headlands and the work partition(s) in concert in order to segment the agricultural field polygon into areas that are sized and shaped to optimize the workable area of the agricultural field.

FIG. 5 illustrates a first example of a method performed by the controller 101 in some implementations for defining the geometry of a headland based on the field boundary polygon. First, the top "edge" of the field boundary is defined by the controller (step 501). As illustrated in the example of FIG. 6A, the top edge of the field boundary may be determined by adjusting the orientation angle of the field boundary polygon 600 so that straight/parallel side edges of the field area are positioned oriented vertically and then defining the top edge 601 as the sequence of points that include any lateral offset from the vertical side edges.

The top edge 601 is then replicated and shifted downward (i.e., inward towards the middle of the field boundary polygon) by a defined offset. In some implementations, the offset is defined by a user input while, in some other implementations, the offset is automatically determined based on factors including, for example, a turning radius of the agricultural machine (e.g., the offset is at least large enough to accommodate the area required for the agricultural machine to perform an end turn while working the work partition 201) and/or the width of the working implement of the agricultural machine (e.g., the offset is defined to provide a headland width that can accommodate an integer number of guidance tracks). FIG. 6B illustrates an example of the top edge 601 replicated and shifted by the defined offset "A." The replicated edge serves as the bottom edge 603 of the headland while the portion of the field boundary polygon between the top edge 601 and the bottom edge 603 corresponds to the headland polygon. The portion of the field boundary polygon that is not included in any headland polygon defines the work partition polygon 607.

In some situations, the shifting operation and the difference geometry operation may leave small "fingers" where the work partition extends along the side edge of a headland and/or where the headland extends along the side edge of a work partition. In some implementations, these fingers are a result of precision inaccuracies and do not match the expected (or preferred) shape of a headland. For example, as illustrated in FIG. 6B, the shape of the top edge 601, when shifted as 603, results in increasingly narrow areas between the top edge 601 and the bottom edge 603 towards the side edge of the field boundary polygon 607. To eliminate these noisy fingers from the partitions during the segmenting process, the controller 101 is further configured to buffer the partition area 607 outward laterally by a defined buffer width (step 505) before using the difference geometry operation to define the shape of the headland polygon (step 507).

As illustrated in the example of FIG. 6C, the work partition area 607 is buffered outward by "stretching" the work partition area 607 below the bottom edge 603 until the work partition area 607 extends beyond the side end of the field boundary polygon by a defined buffer width "B." In some implementations, the controller 101 may be configured to perform this buffering by stretching the bottom edge 603 laterally instead of laterally stretching the entire work partition polygon. As illustrated in FIG. 6C, this lateral buffering of the work partition eliminates the fingers of the headland 605 that extend narrowly along the side edges of the work partition 607. The final polygon for the headland 605 is determined using difference geometry and is defined as the portion of the field boundary polygon 600 that is not included in the laterally buffered (e.g., stretched) work partition 607. FIG. 6D illustrates the final geometry of the headland polygon as determined by the method of FIG. 5 according to this example.

In some situations, an irregular shape of the field boundary polygon can result in areas of the field that are not included in the work partition and, due to their size and/or shape, are too small to be worked separately as a headland. FIG. 7 illustrates an alternate method for defining the shape of headland polygons after first defining a preliminary shape of a work partition (step 701). This preliminary shape of the work partition may be defined using the method of FIG. 5 or another method. Based on the preliminary work partition polygon and the overall field boundary polygon, a difference geometry operation is used to identify one or more "headland candidates" (step 703). Headland candidates are separate portions of the field boundary polygon that are not included within the work partition polygon. FIG. 8A illustrates an example of a portion of a field boundary polygon with a preliminary work partition 801 defined. The difference geometry operation identifies a first headland candidate 803 and a second headland candidate 805.

After identifying the headland candidates, the controller 101 is configured to calculate an area of each headland candidate (step 705) and compare each calculated area to a threshold (step 707). If the area of a headland candidate is below the minimum area threshold, then it is removed as a candidate. Conversely, if the area of the headland candidate is above the minimum area threshold, then it is confirmed as a headland and a work plan is generated for the confirmed headland (as described further below). In some implementations, the minimum area threshold is determined based, for example, on work or land parameters (e.g., based on the width of the implement to be used or as a percentage of the area of the complete field boundary polygon) while, in some other implementations, the minimum area threshold is defined as a static value.

In some implementations, the controller 101 may be configured to further apply a buffer partition filtering operation (similar to the operation described above in reference to FIG. 5) to refine the shape of confirmed headlands and/or the shape of the preliminary work partition after confirming which candidate headlands are actual headlands. In this example, the buffer partition filtering operation is applied for confirmed headlands by buffering a work partition laterally outward relative to the confirmed headland (step 709) and then using difference geometry to define the shape of the headland polygon. In some such implementations, the controller 101 may be further configured to update the preliminary work partition polygon based on any changes to the headland polygon that are made during the buffer partition filtering.

For example, FIG. 8A illustrates a situation in which the shape of the work partition 801 leaves a small finger of the headland 805 that extends narrowly along the side edge of the work partition 801. After headland 805 has been confirmed as a headland, the controller 101 buffers the work partition 801 laterally outward relative to the confirmed headland 805 by a defined buffer amount "B" as illustrated in FIG. 8B. The difference geometry operation is then applied again to define the shape of the headland 805 as the portion of the field boundary polygon that is not included within the outwardly buffered work partition 801. In some implementations, the controller 101 may be configured to update the work partition 801 to include any portions of the field boundary polygon that were removed from a confirmed headland (e.g., headland 805) by this buffer partition filtering operation. Accordingly, in FIG. 8C, the final updated shape of the work partition 801 now includes the finger portion 807 that was removed from headland 805.

In the example of FIGS. 8A through 8C, portions of the field boundary polygon that are not included in the work partition and are also determined to be too small to be "headlands" (e.g., headland candidate 803) are simply omitted from the work plan (as shown in FIG. 8C). However, in some other implementations, after confirming the which headland candidates will be worked as actual headlands (and, in some cases, after updating the shape of the confirmed headlands via filtering), the controller 101 is configured to once again apply the difference geometry operation to update the work partition to include all areas of the field boundary polygon that are not within a confirmed, updated headland polygon. Accordingly, in some implementations, the controller 101 would update the shape of the work partition 801 in the example of FIG. 8C to include the area of headland candidate 803 after determining that the calculated area of the headland candidate 803 is below the minimum area threshold.

Figure 9:
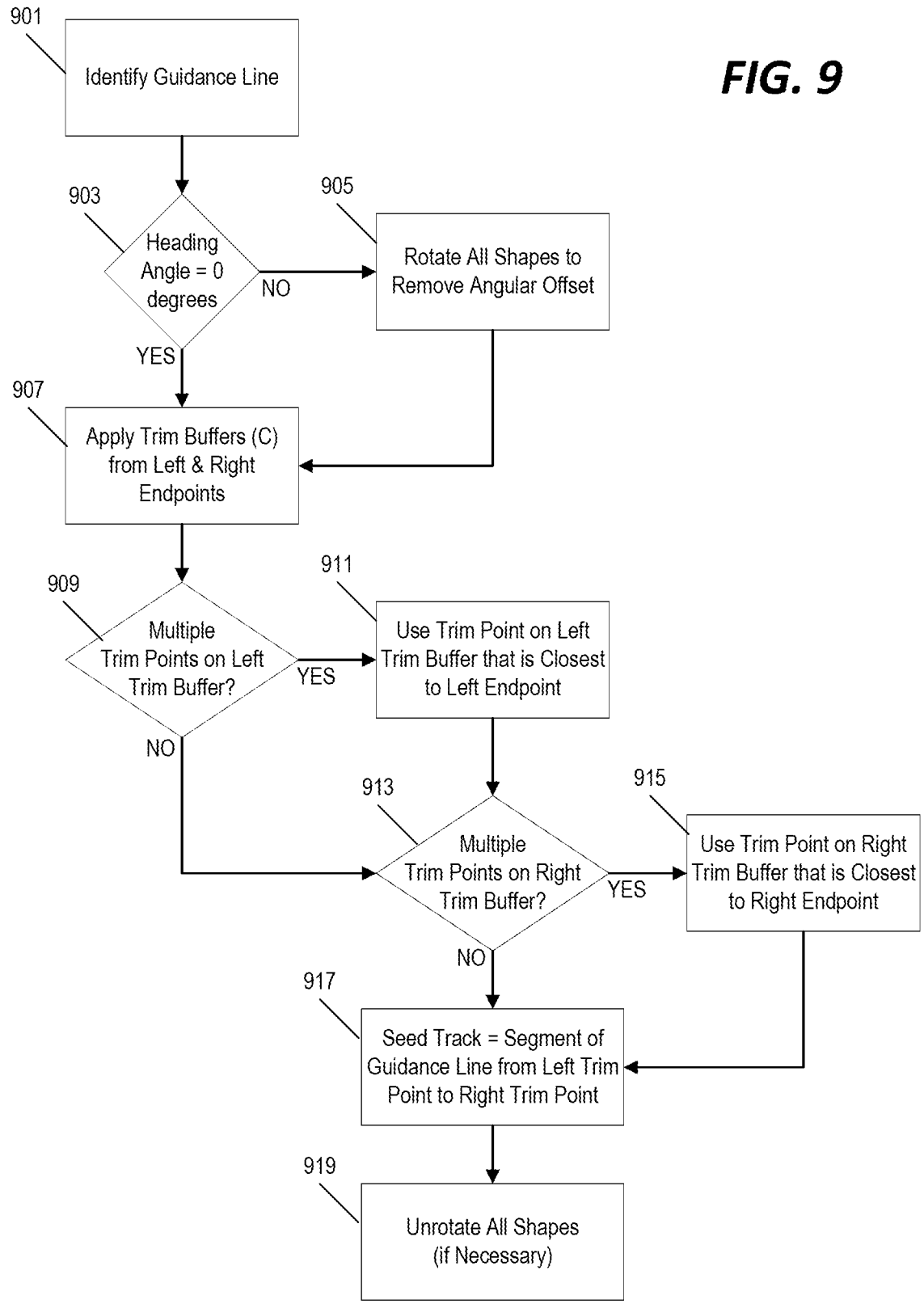
FIG. 9 is a flowchart of a method for determining a seed track based on the determined shape of the top or bottom headland executed as part of the method of FIG. 4.

Once the headland polygons have been defined for the field boundary polygon, the controller 101 generates a work plan for each headland by generating a seed track for the headland and then generating a plurality of guidance tracks within the headland based on the seed track. FIG. 9 illustrates an example of a method performed by the controller 101 in some implementations for generating a seed track for a headland. First, the controller 101 identifies a guidance line (step 901). In some implementations, the controller 101 is configured to identify the guidance line as the portion of the edge of the headland polygon that aligns with the edge of the field boundary polygon (i.e., the portion of the edge of the headland polygon that is not shared with a work partition or another headland).

In some implementations, the controller 101 is configured to rotate the untrimmed guidance line (and the entire field boundary polygon) to align the reference frame so that a "top" headland and a "bottom" headland are positioned vertically on the top and bottom of the work partition even if the top and bottom headlands do not necessarily correspond with "north" and "south" directions, respectively. This rotation can be performed based on a heading angle offset wherein the heading angle is the angle relative to north-south to be followed by the agricultural machine between the top and bottom headlands while working the work partition (i.e., according to the work plan defined for the work partition). In some implementations, where the controller 101 is configured to define a work plan for the work partition before defining the work plan for the headlands, the controller 101 may be configured to determine this heading angle—and, therefore, the angle by which to rotate the polygons at this step—based on the defined work plan for the work partition. In some other implementations, the controller 101 may be configured to rotate the polygons based on a "heading angle" provided by the user. In still other implementations, the controller 101 may be configured to determine an appropriate rotation angle for the polygons based on the relative shape and sizes of the various segmented portions within the field boundary polygon to achieve a rotational position where the headlands are positioned more accurately as top and bottom headlands (e.g., along a vertical axis).

Figure 10A:
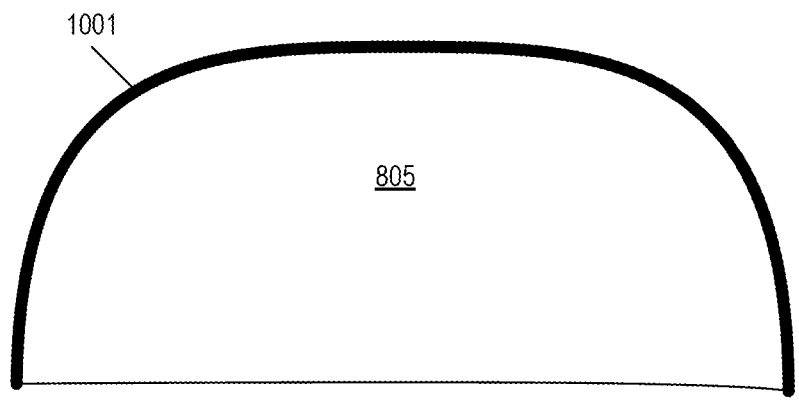
FIGS. 10A through 10C are schematic overhead views of a top headland of an agricultural field demonstrating the process of determining of the seed track using the method of FIG. 9.
Figure 10B:
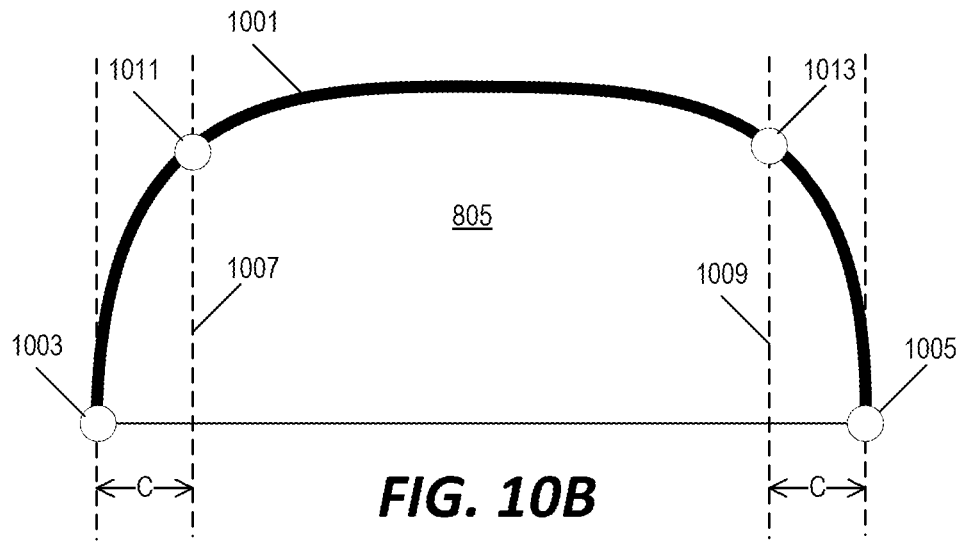

Returning to the flowchart of FIG. 9, if the heading angle is anything other than 0° (step 903), then the controller 101 rotates all polygons to remove the angular offset and to align the polygons with the top-bottom reference frame (step 905). The controller 101 then trims the guidance line by applying a lateral trim buffer at a defined lateral distance from each end point (step 907) and identifying a left trim point and a right trim point. FIG. 10A illustrates an example of a guidance line 1001 for a headland 805. As illustrated in FIG. 10B, a lateral trim buffer is applied to the left end point 1003 of the guidance line 1001 by defining a vertical line 1007 that is laterally offset from the left end point 1003 by the defined trim buffer width "C." The left trim point 1011 is defined as the point on the guidance line 1001 that intersects with the vertical line 1007. Similarly, the lateral trim buffer is applied to the right end point 1005 of guidance line 1001 by defining a vertical line 1009 that is laterally offset from the right end point 1005 by the same defined trim buffer width "C." The right trim point 1013 is defined as the point on the guidance line 1001 that intersects with the vertical line 1009.

If the shape of the untrimmed guidance line results in a situation in which there are multiple trim points on the left trim buffer line (step 909) (i.e., the untrimmed guidance line crosses the left trim buffer line multiple times), then the controller 101 is configured to define the left trim point as the trim point on the left vertical trim buffer line that is closest to the left endpoint (step 911). Similarly, if the shape of the untrimmed guidance line results in a situation in which there are multiple trim points on the right trim buffer line (step 913) (i.e., the untrimmed guidance line crosses the left trim buffer line multiple times), then the controller 101 is configured to define the right trim point as the trim point on the right vertical trim buffer line that is closest to the right end point (step 915).

Figure 10C:
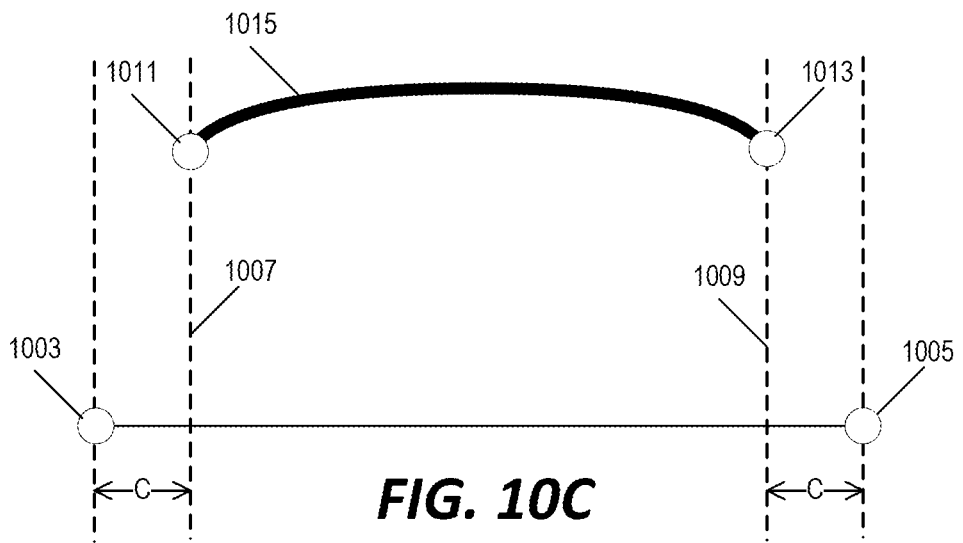

Once the left trim point and the right trim point are defined, then the controller 101 defines the seed track for the headland as the segment of the guidance line from the left trim point and the right trim point (step 917). FIG. 10C illustrates the seed track 1015 determined as the portion of the guidance line 1001 that extends from the left trim point 1011 to the right trim point 1013. The polygons are then unrotated if necessary to realign the seed track with the geospatial reference frame (step 919).

Figure 11A:
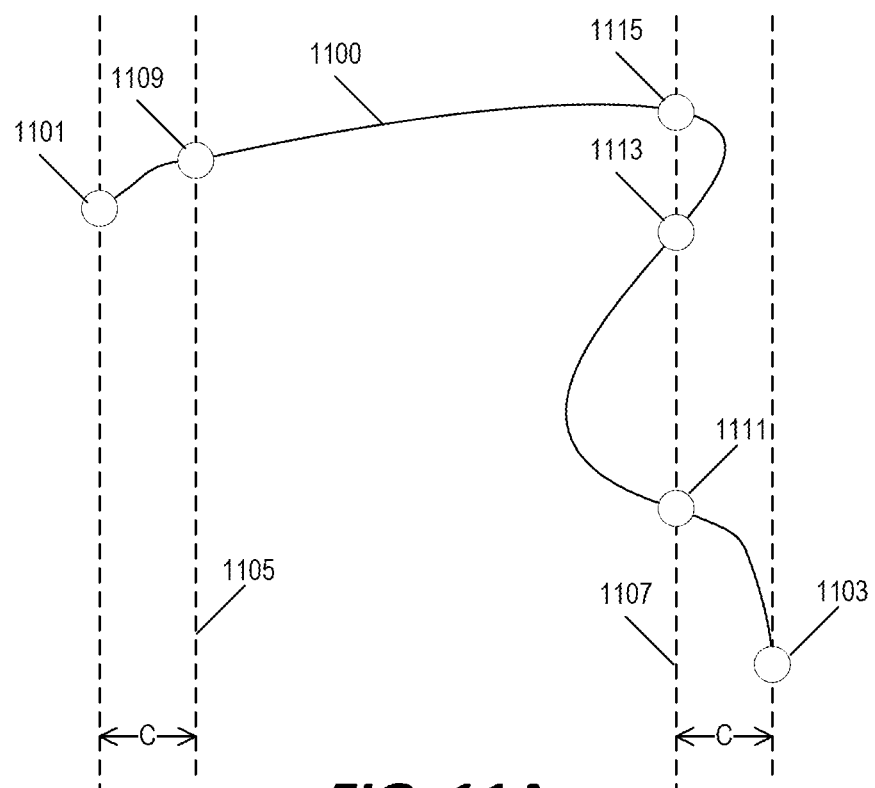
FIGS. 11A and 11B are schematic overhead views of a top headland demonstrating the process of determining the seed track using the method of FIG. 9 for an agricultural field with an irregularly shaped field edge including both convex and concave curves.

FIGS. 10A through 10C illustrate an example in which all points on the guidance line 1001 are positioned to the right of the left endpoint and to the left of the right endpoint, and there are no changes in the concavity/convexity along the guidance line 1001. However, some agricultural fields will have more complicated edge shapes. FIG. 11A illustrates an example of a guidance line 1100 for a headland. The guidance line 1100 extends from a left end point 1101 to a right end point 1103. Vertical line trim buffers 1105, 1107 are applied to the guidance line 1100, each at the defined trim buffer width "C" from the respective end points 1101, 1103. The guidance line 1100 crosses the left vertical line trim buffer 1105 only once and so the left trim point 1109 is defined as the point at which the guidance line crosses the left vertical trim buffer 1105 (FIG. 9, step 909).

Figure 11B:
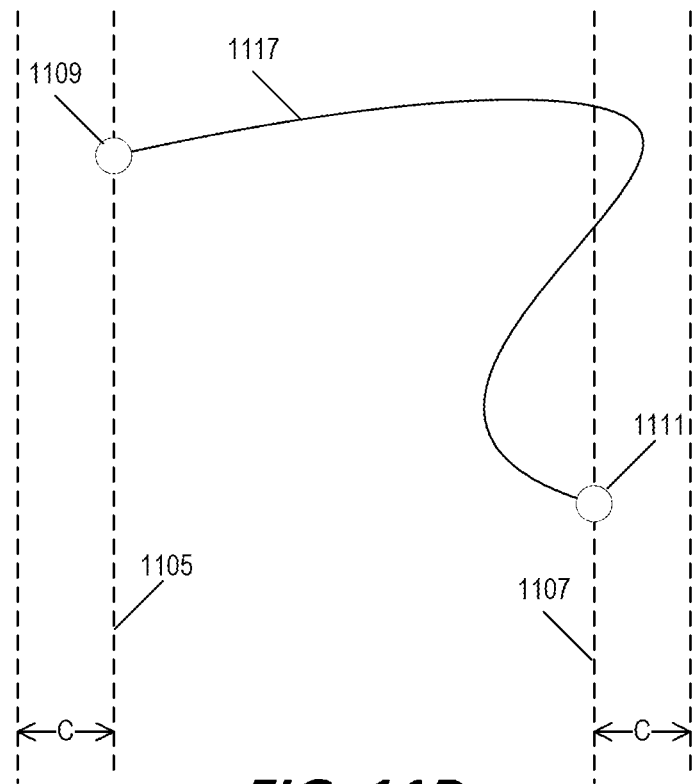

However, a concavity in the shape of the field boundary polygon causes the guidance line 1100 to cross the right vertical line trim buffer 1107 three different times. Each point 1111, 1113, 1115 at which the guidance line 1100 crosses the right vertical line trim buffer 1107 is identified by the controller 101 as a potential trim point and then the controller 101 analyzes the guidance line 1100 and the locations of the potential trim points 1111, 1113, 1115 along the guidance line to determine which potential trim point 1111, 1113, 1115 to use as the right trim point for the seed track (i.e., which potential trim point 1111, 1113, 1115 is closest to the right end point 1103 (FIG. 9, steps 913 & 915). In following the guidance line 1100 from the right end point 1103 towards the left end point 1101, the first potential trim point encountered by the controller is potential trim point 1111. Accordingly, the controller 101 determines that potential trim point 1111 is the closest potential trim point to the right end point 1103 and, in response, uses potential trim point 1111 as the right trim point for the seed track. The controller 101 then defines the seed track 1117 as the segment of the guidance line 1100 extending from the left trim point 1109 to the right trim point 1111 as shown in FIG. 11B.

Figure 12A:
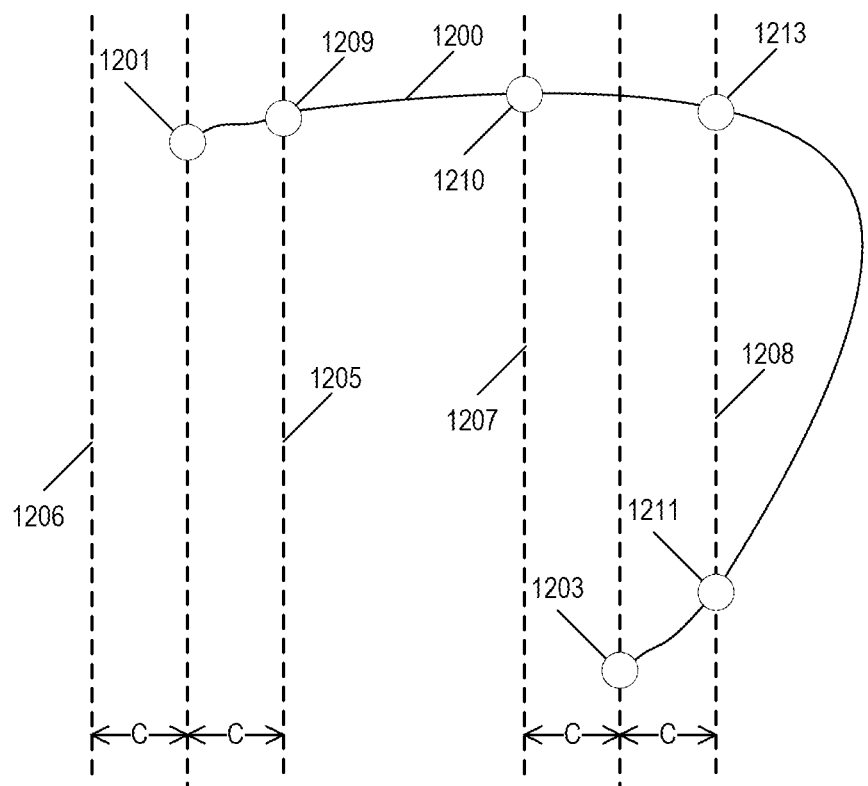
FIGS. 12A and 12B are schematic overhead views of a top headland demonstrating the process of determining the seed track using the method of FIG. 9 for an agricultural field with an irregular shaped field edge including a concavity that extends laterally beyond an endpoint of the top headland.

In the examples illustrated above, the shape of the guidance line is such that all points on the guidance line lie between the left and right end points along an x-axis. However, FIG. 12A illustrates an example of a guidance line 1200 for a headland in which, due to the shape of the edge of the field boundary polygon, several points along the guidance line 1200 lie beyond the x-axis range between the left end point 1201 and the right end point 1203 of the guidance line 1200. In some implementations, the controller 101 may be configured to apply only one vertical line trim buffer for each end point of the guidance line. In some such implementations, the controller 101 would place the left vertical line trim buffer 1205 at the defined trim buffer width "C" to the right of the left end point 1201 and would place a right vertical line trim buffer 1207 at the defined trim buffer width "C" to the left of the right end point 1203. Because the guidance line 1200 only crosses the left vertical line trim buffer 1205 once (at point 1209) and only crosses the right vertical line trim buffer 1207 once (at point 1210), the controller 101 would define the seed track as the segment of the guidance line 1200 extending from point 1209 to point 1210.

However, in other implementations, the controller 101 is configured to apply a vertical line trim buffer on both sides of each end point to account for situations in which the curvature of the guidance line results in points along the guidance line that lie beyond the x-axis range between the left end point and the right end point of the guidance line (such as guidance line 1200 in the example of FIG. 12A). As further illustrated in FIG. 12A, the controller 101 is configured to place a first vertical line trim buffer 1206 and a second vertical line trim buffer 1205 at the defined trim buffer width "C" on opposite sides of the left end point 1201. Similarly, the controller 101 is configured to place a third vertical line trim buffer 1207 and a fourth vertical line trim buffer 1208 at the defined trim buffer width "C" on opposite sides of the right end point 1203.

In some implementations, the controller 101 is configured to identify all points where the guidance line 1200 crosses either vertical line trim buffer at the defined buffer width "C" from a given end point as potential trim points for that respective end of the guidance line. More specifically, in the example of FIG. 12A, the controller 101 would be configured to identify any points where the guidance line 1200 crosses the first vertical line trim buffer 1206 or the second vertical line trim buffer 1205 as potential left trim points. And, similarly, the controller 101 would identify any points where the guidance line 1200 crosses the third vertical line trim buffer 1207 or the fourth vertical line trim buffer 1208 as potential right trim points.

Figure 12B:
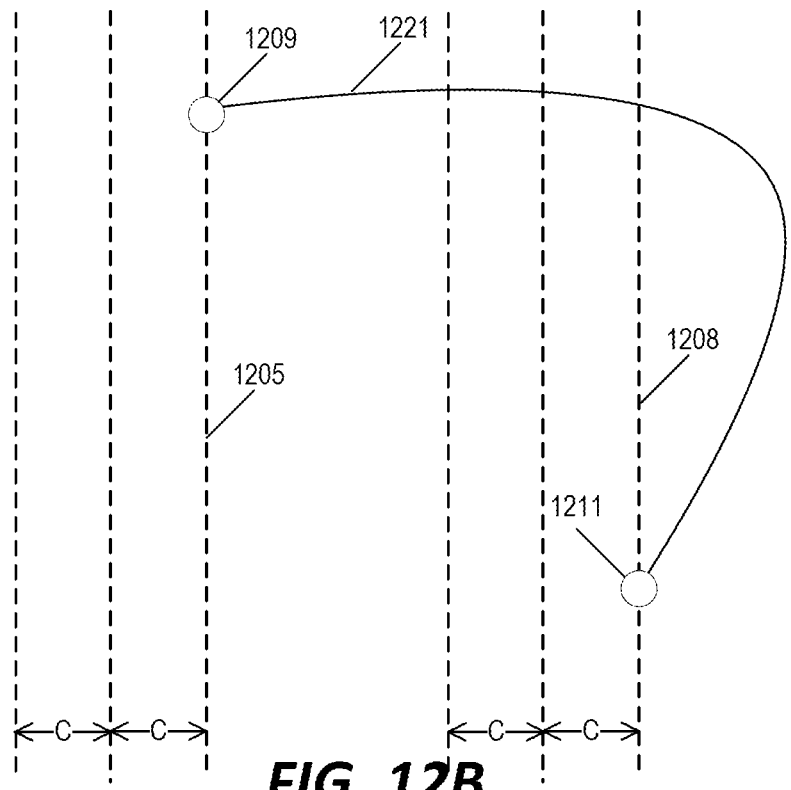

In the specific example of FIG. 12A, the guidance line 1200 does not cross the first vertical line trim buffer 1206 and only crosses the second vertical line trim buffer 1205 once (at point 1209). Accordingly, the controller 101 identifies point 1209 as the left trim point for the guidance line 1200. However, the guidance line 1200 crosses the third vertical line trim buffer 1207 once (at point 1210) and also crosses the fourth vertical line trim buffer 1208 twice (at points 1211, 1213). Accordingly, point 1210, point 1211, and point 1213 are all identified by the controller 101 as potential right trim points for the guidance line 1200. As described above in reference to the method of FIG. 9, in situations where multiple right trim points have been identified (step 913), the controller 101 is configured to select the right trim point as the trim point that is closest to the right end point 1203 along the guidance line 1200 (step 915). In the particular example of FIG. 12A, as the controller 101 follows the guidance line 1200 from the right end point 1203 to the left end point 1201, the first potential right trim point encountered is point 1211. Accordingly, the controller 101 identifies point 1211 as the right trim point for the guidance line 1200. The controller 101 then defines the seed track 1221 as the segment of the guidance line 1200 extending from the left trim point 1209 to the right trim point 1211 as shown in FIG. 12B.

Figure 13:
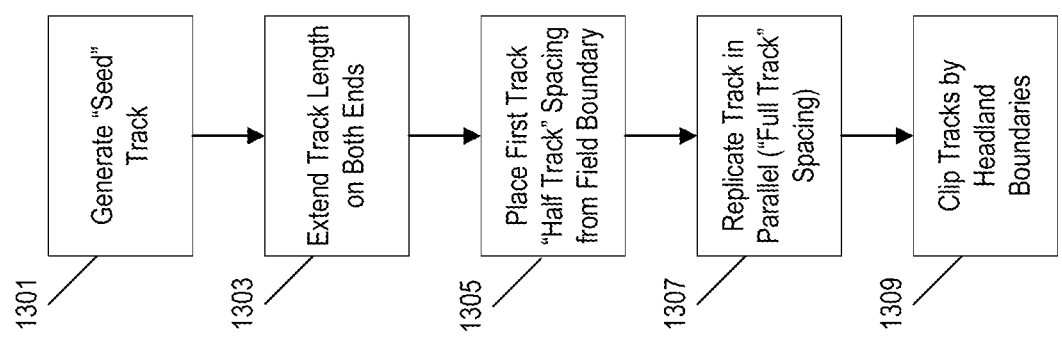
FIG. 13 is a flowchart of a method for defining a work plan for a top or bottom headland based on a determined seed track executed as part of the method of FIG. 4.

As described above in reference to the method of FIG. 4, after a seed track has been generated for a headland, the work plan for that headland is developed by the controller 101 by defining one or more guidance tracks within the headland based on the seed track. FIG. 13 illustrates an example of a method executed by the controller 101 in some implementations for developing a work plan for a headland based on a generated seed track (e.g., a seed track generated by the method of FIG. 9). After the seed track has been generated for the headland (step 1301), the controller 101 generates a template guidance track by extending both ends of the seed track to ensure that the template guidance track will extend beyond a maximum width of the headland regardless of where the template guidance track is positioned within the headland (step 1303). Accordingly, in some implementations, the controller 101 is configured to determine a magnitude by which to extend the seed track based on the dimensions of the headland.

Figure 14A:
FIGS. 14A through 14C are schematic overhead views of a top headland demonstrating the process for extending the seed track according to the method of FIG. 13.
Figure 14B:
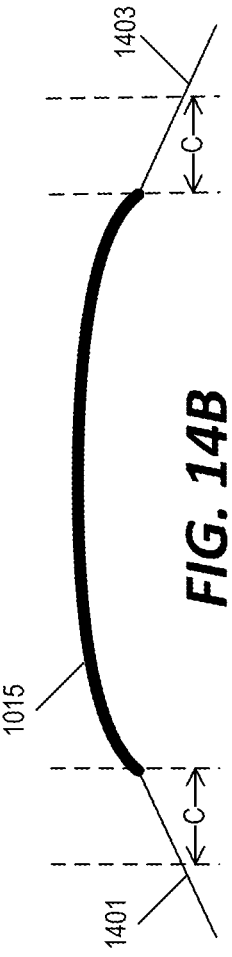
Figure 14C:
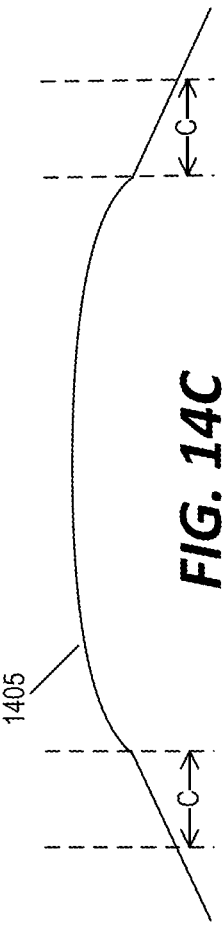

FIG. 14A illustrates the seed track 1015 for headland 805 that had been determined by the controller 101 in the example of FIGS. 10A through 10C. FIGS. 14B and 14C illustrate an example of a template guidance track 1405 generated by extending the seed track 1015 on a left end 1401 and on the right end 1403. FIGS. 14A through 14C are overlaid with the positions of the vertical line trim buffers from the example of FIGS. 10A through 10C to demonstrate that the extensions 1401, 1403 to the seed track 1015 result in a template guidance track 1405 that extends laterally beyond the location of the left end point and the right end point of the guidance line 1001 that was used to generate the seed track 1015.

In various different implementations, the controller 101 may be configured to utilize different mechanisms for extending the seed track to form the template guidance track. For example, in some implementations, the controller 101 may be configured to utilize a best linear fit mechanism, a curve fitting technique, or a combination of the two techniques to generate a template guidance track that is based on the seed track with a maximum curvature that is limited by a defined curvature threshold (e.g., to prevent sharp turns or complex movements that would need to be performed by the agricultural machine in following the template guidance track). In some implementations, the controller 101 may be configured to define the curvature threshold for the template guidance track based on the operating characteristic of the agricultural machine (e.g., maximum turn radius).

Once the template guidance track has been generated, the controller 101 defines a work plan by replicating the template guidance track at defined spacing intervals within the headland polygon until the area of the headland polygon is filled. In some implementations, a first template guidance track is placed at a first defined distance from the outer edge of the field boundary polygon (step 1305). In some implementations, the offset distance for the placement of the first template guidance track is determined based on a known width of the implement that will be used to work the headland (i.e., half-track spacing) such that, when the agricultural machine follows the first guidance track, the work area covered by the implement of the agricultural machine extends to the field boundary. Additional instances of the template guidance track are then positioned with a defined spacing between the template guidance tracks until the entire area of the headland polygon is covered by template guidance tracks (step 1307). In some implementations, the controller 101 is configured to space the template guidance tracks from adjacent template guidance tracks using full-track spacing (i.e., the distance between adjacent guidance tracks corresponds to a working width of the implement that will be used by the agricultural machine to work the headland).

Figure 15A:
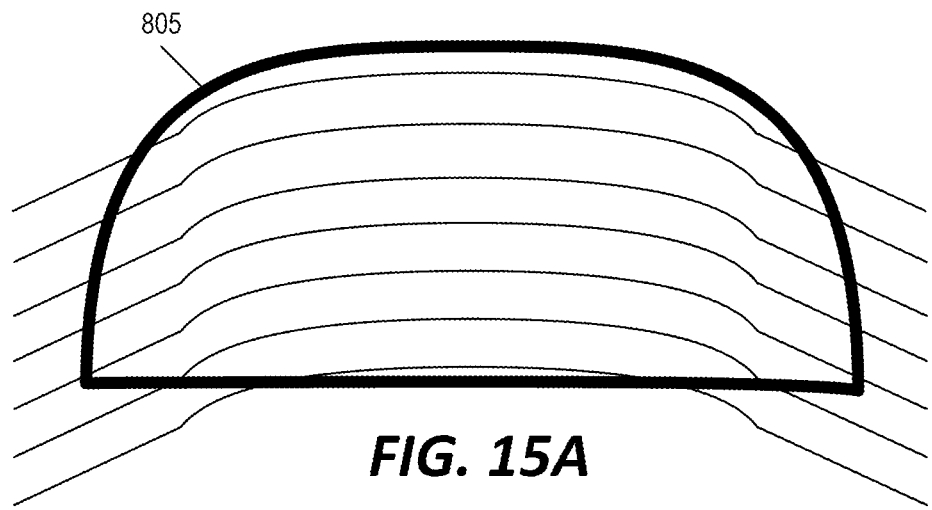
FIGS. 15A and 15B are schematic overhead views of the top headland demonstrating the process for defining the work plan for the top headland based on the extended seed track according to the method of FIG. 13.
Figure 15B:
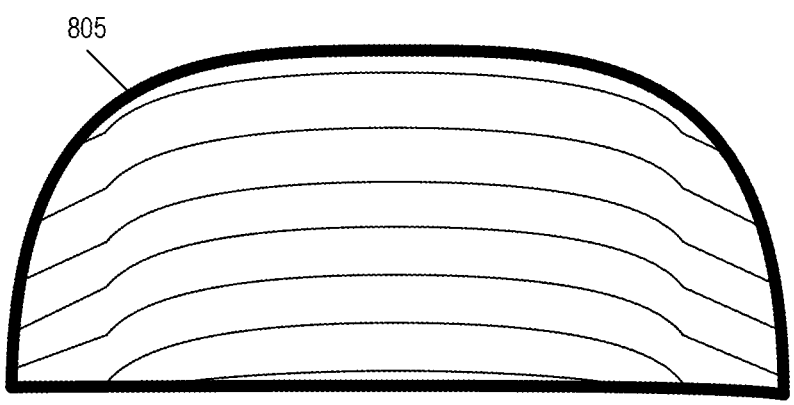

FIG. 15A illustrates an example of the template guidance track 1405 replicated and positioned to cover the area of the headland polygon for headland 805. As illustrated in this example, the template guidance tracks extend beyond the area of the headland polygon and, accordingly, may extend beyond the workable area of the agricultural field itself. Accordingly, the controller 101 is configured to convert the series of spaced template guidance tracks to an actual work plan including a plurality of guidance tracks for the headland by clipping all portions of the template guidance tracks that extend beyond the boundaries of the headland polygon for the headland (step 1309). FIG. 15B illustrates an example of the work plan generated by the controller 101 after the template guidance tracks are positioned and clipped according to the method of FIG. 13.

In some implementations, the controller 101 may be configured to utilize a headland buffer to grow the area of the headland polygon along the entire boundary of the headland polygon before positioning the template guidance tracks in order to ensure that the full headland area will be worked. For example, the controller 101 may be configured to grow the area of the headland by applying a headland buffer that is determined, for example, based on a width of the equipment frame of the agricultural machine, a working width of the implement of the agricultural machine, or a user-defined or static offset amount. In some implementations where a buffer offset is used to grow the area of the headland polygon before placing the guidance tracks, the controller 101 may still be configured to place the first instance of the template guidance track relative to the original boundary of the headland polygon (e.g., using half-track spacing) and to then replicate the template guidance track on both sides of the first template guidance track. After the template guidance tracks are replicated at the defined spacing to fill the entire expanded headland polygon, the template guidance tracks are trimmed based on the boundaries of the actual headland polygon to generate the work plan for the headland.

In the examples described above, the field boundary polygon is segmented into one or more work partitions and one or more headlands. The controller 101 is then configured to determine a work plan for a headland based, at least in part, on a shape of the field boundary portion of the headland polygon. In some cases, a controller 101 is configured to determine a single work plan (i.e., a set of guidance tracks) for an entire headland. However, in some implementations, the controller 101 may be configured to further segment a single headland into multiple different headland polygons (e.g., in situations with an irregularly shaped field edge in the headland polygon).

For example, an edge boundary of a work partition polygon includes a segment that is shared with a boundary of an adjacent work partition (i.e., an intersection segment) and a segment that corresponds to an edge boundary of the field (as illustrated in the various examples above). In some implementations, the controller 101 may be configured to analyze a headland polygon (after the field boundary polygon is segmented and before a work plan is generated for the headland) by measuring, for each point along the intersection segment, a distance to a nearest point of the field boundary and comparing that distance to a "pinch" threshold. If the measured distance for any point along the intersection segment is below the pinch threshold, the controller 101 divides the headland polygon into two separate headland polygons at that point (i.e., a "pinch point") and proceeds to develop separate work plans for the separated headland polygons (e.g., as described in the examples of FIG. 9 through 15B above).

Alternatively or additionally, in some implementations, the controller 101 may be configured to determine during the process of plotting the guidance tracks (e.g., as discussed above in reference to FIG. 13 through 15B) whether to further segment a single headland polygon into multiple different headland polygons. For example, the controller 101 may be configured to detect situations where replicating the template guidance track results in the placement of a template guidance track that exits the headland polygon into a work partition polygon and then subsequently reenters the headland polygon (i.e., such that a "middle" portion of the template guidance track is positioned within the work partition polygon). In some implementations, in response to detecting this situation, the controller 101 is configured to segment the headland polygon into two separate headland polygons at a point along the middle portion of the template guidance track where the template guidance track has left the headland polygon. The controller 101 would then restart the process of generating separate work plans for each of the newly separated headland polygons.

The systems and methods set forth in the examples above provide, among other things, mechanisms for generating a work plan for a headland by defining a seed track based on a field edge portion of the headland polygon and defining a plurality of spaced guidance tracks positioned within the headland, where the shape of each guidance track is based on the shape of the seed track. Other features and advantage are set forth in the following examples and in the claims.

Example 1. A system configured to generate a work plan for a headland of an agricultural field, wherein the headland is positioned adjacent to a work partition of the agricultural field and is used by an agricultural machine to perform edge turns while performing a work task in the work partition of the agricultural field, the system comprising an electronic controller configured to: determine a field boundary polygon indicative of a workable area of the agricultural field, wherein the field boundary polygon is segmented into a plurality of segments, the plurality of segments including a headland polygon defining a shape and a size of the headland and a work partition polygon defining a shape and a size of the work partition; identify a segment of a boundary of the headland polygon that is shared in common with a field edge boundary of the field boundary polygon; generate a seed track based on a shape of at least a portion of the identified segment; and define a plurality of guidance tracks for the headland by replicating the seed track at a defined spacing throughout the headland polygon, wherein each guidance track is indicative of a path to be followed by the agricultural machine while performing the work task in the headland of the agricultural field.

Example 2. The system of example 1, wherein the electronic controller is further configured to facilitate operation of the agricultural machine in accordance with the generated work plan.

Example 3. The system of example 2, wherein the electronic controller is configured to facilitate operation of the agricultural machine in accordance with the generated work plan by monitoring a geospatial position of the agricultural machine while performing the work task in the headland, and transmitting control signals to a steering system of the agricultural machine based on the geospatial position of the agricultural machine and the work plan to cause the steering system of the agricultural machine to steer the agricultural machine along a guidance track of the plurality of guidance tracks.

Example 4. The system of example 2, wherein the electronic controller is configured to facilitate operation of the agricultural machine in accordance with the generated work plan by monitoring a geospatial position of the agricultural machine while performing the work task in the headland, displaying on a user interface display screen a graphical representation of the work plan including a graphical representation of at least a portion of the plurality of guidance tracks, and displaying on the user interface a graphical indication of a geospatial position of the agricultural machine relative to the displayed guidance tracks.

Example 5. The system of any of examples 1 through 4, wherein the electronic controller is configured to define the plurality of guidance tracks by positioning a first copy of the seed track at a first defined distance from the corresponding segment of the boundary of the headland polygon, positioning a second copy of the seed track at a second defined distance from the first copy of the seed track, and positioning a third copy of the seed track at the second defined distance from the second copy of the seed track.

Example 6. The system of example 5, wherein each guidance track of the plurality of guidance tracks is indicative of a sequence of target positions for a center of an implement used by the agricultural machine in performing the work task, wherein the second defined distance is based at least in part on an operating width of the implement, and wherein the first defined distance is based at least in part on half of the operating width of the implement.

Example 7. The system of any of examples 1 through 6, wherein the electronic controller is configured to generate the seed track by: defining a guidance line with a shape and a size corresponding to an entire length of the boundary of the headland polygon that is shared in common with the field edge boundary of the field boundary polygon, and trimming the guidance line on both ends based on a defined lateral trim buffer width such that a left end point of the trimmed guidance line corresponds to a closest point along the guidance line to a left end of the guidance line that is laterally offset from the left end of the guidance line by the defined lateral trim buffer width and a right end point of the trimmed guidance line corresponds to a closest point along the guidance line to a right end of the guidance line that is laterally offset from the right end of the guidance line by the defined lateral trim buffer width.

Example 8. The system of example 7, wherein the electronic controller is configured to generate the seed track further by extending both ends of the guidance line such that a lateral width of the extended guidance line exceeds a maximum lateral width of the headland polygon, wherein the seed track includes the extended guidance line.

Example 9. The system of example 8, wherein the electronic controller is configured to define the plurality of guidance tracks for the headland by trimming any portion of a replicated seed track that extends beyond the boundary of the headland polygon.

Example 10. The system of any of examples 1 through 9, wherein the electronic controller is further configured to: define the work partition polygon based on a work partition work plan, wherein the work partition polygon does not include areas of the agricultural field where the agricultural machine performs edge turns for the work partition work plan, and define one or more headland candidate polygons including all portions of the field boundary polygon that are not included in the work partition polygon, wherein the one or more headland candidate polygons includes the headland polygon.

Example 11. The system of example 10, wherein the electronic controller is further configured to: compare each of the one or more headland candidate polygons to a minimum headland area threshold, and generate headland work plans for each of the one or more headland candidate polygons with an area exceeding the minimum headland area threshold.

Example 12. The system of any of examples 1 through 11, wherein the electronic controller is further configured to define the headland polygon by identifying a base line of the field boundary polygon; and defining the headland polygon as including all portions of the field boundary polygon that are within a defined base line offset distance of the identified base line of the field boundary polygon.

Example 13. The system of example 12, wherein the defined base line offset distance is determined based on at least one selected from a group consisting of a user-defined offset value, a turning radius of the agricultural machine, an operating width of an implement used by the agricultural machine in performing the work task, and another operating parameter of the agricultural machine.

Example 14. The system of any of examples 1 through 11, wherein the electronic controller is further configured to define the headland polygon by identifying a base line of the field boundary polygon; replicating the base line at a defined shift offset distance from the base line; and defining the headland polygon based on an area of the field boundary polygon located between the base line and the replicated, shifted base line.

Example 15. The system of any of examples 1 through 11, wherein the electronic controller is further configured to define the headland polygon by determining an initial work partition polygon and an initial headland polygon, increasing a lateral width of the initial work partition polygon relative to the initial headland polygon by a defined lateral buffer amount, and defining the headland polygon based on an area of the initial headland polygon that is not occupied by the laterally increased work partition polygon.

Example 16. The system of any of examples 1 through 15, wherein the electronic controller is further configured to: identify a pinch point in the headland polygon, further segment the headland polygon into a first headland polygon and a second headland polygon based on the identified pinch point, and define a first work plan for the first headland polygon and define a second work plan for the second headland polygon.

Example 17. The system of example 16, wherein the electronic controller is configured to identify the pinch point in the headland polygon by identifying a work partition boundary edge of the headland polygon that is shared in common with a boundary of the work partition polygon, and detecting a point on the work partition boundary edge that is less than a defined minimum distance from any point on the identified segment of the boundary of the headland polygon that is shared in common with the field edge boundary of the field boundary polygon.

Example 18. The system of example 16, wherein the electronic controller is configured to identify the pinch point in the headland polygon by detecting a location where an interior portion of a copy of the seed track is positioned within the work partition polygon, wherein the interior portion of the copy of the seed track is between two segments along the length of the copy of the seed track that are both positioned within the headland polygon.

Example 19. A method of generating a work plan for a headland of an agricultural field, wherein the headland is positioned adjacent to a work partition of the agricultural field and is used by an agricultural machine to perform edge turns while performing a work task in the work partition of the agricultural field, the method comprising: determining a field boundary polygon indicative of a workable area of the agricultural field, wherein the field boundary polygon is segmented into a plurality of segments, the plurality of segments including a headland polygon defining a shape and a size of the headland and a work partition polygon defining a shape and a size of the work partition; identifying a segment of a boundary of the headland polygon that is shared in common with a field edge boundary of the field boundary polygon; generating a seed track based on a shape of at least a portion of the identified segment; and defining a plurality of guidance tracks for the headland by replicating the seed track at a defined spacing throughout the headland polygon, wherein each guidance track is indicative of a path to be followed by the agricultural machine while performing the work task in the headland of the agricultural field.

Example 20. A system for operating an agricultural machine to perform a work task on an agricultural field, the system comprising one or more electronic controllers configured to: determine a field boundary polygon indicative of a workable area of the agricultural field; segment the field boundary polygon into a plurality of work area polygons including a work partition polygon, a top headland polygon, and a bottom headland polygon, wherein the top headland polygon and the bottom headland polygon are positioned on opposite sides of the work partition polygon; define a work plan for the work partition polygon, wherein the work plan for the work partition polygon includes a first plurality of work partition guidance tracks each indicative of a path to be followed by the agricultural machine while performing the work task in a portion of the agricultural field corresponding to the work partition polygon; define a work plan for the top headland polygon by identifying a segment of a boundary of the top headland polygon that includes an entire portion of the boundary of the top headland polygon that is shared in common with a field edge boundary of the field boundary polygon, generating a top headland seed track by trimming the segment of the boundary of the top headland polygon on both ends based on a defined lateral trim buffer width, extending the top headland seed track on both ends such that a total lateral width of the extended top headland seed track exceeds a maximum width of the top headland polygon, and defining a plurality of top headland guidance tracks for the work plan for the top headland by replicating the extended top headland seed track at a defined spacing throughout the top headland polygon and trimming any portion of the replicated extended top headland seed tracks that extend beyond the boundary of the top headland polygon; defining a work plan for the bottom headland polygon by identifying a segment of a boundary of the bottom headland polygon that includes an entire portion of the boundary of the bottom headland polygon that is shared in common with the field edge boundary of the field boundary polygon, generating a bottom headland seed track by trimming the segment of the boundary of the bottom headland polygon on both ends based on a defined lateral trim buffer width, extending the bottom headland seed track on both ends such that a total length of the extended bottom headland seed track exceeds a maximum width of the bottom headland polygon, and defining a plurality of bottom headland guidance tracks for the work plan for the bottom headland by replicating the extended bottom headland seed track at the defined spacing throughout the bottom headland polygon and trimming any portion of the replicated extended bottom headland seed tracks that extend beyond the boundary of the bottom headland polygon; operating the agricultural machine by transmitting control signals to a steering system of the agricultural machine to cause the agricultural machine to follow the work partition guidance tracks while performing the work task in the portion of the agricultural field corresponding to the work partition polygon, to follow the top headland guidance tracks while performing the work task in a portion of the agricultural field corresponding to the top headland polygon, and to follow the bottom headland guidance tracks while performing the work task in a portion of the agricultural field corresponding to the bottom headland polygon, wherein the agricultural machine performs edge turns within the portion of the agricultural field corresponding to the top headland polygon or within the portion of the agricultural field corresponding to the bottom headland polygon while transitioning from one work partition guidance track to another work partition guidance track.

What is claimed is:

1. A system configured to generate and at least partially implement a work plan for a headland of an agricultural field, the headland positioned adjacent to a work partition of the agricultural field and is used by an agricultural machine to perform edge turns while performing a work task in the work partition of the agricultural field, the system comprising an electronic controller configured to:
   determine a field boundary polygon indicative of a workable area of the agricultural field, wherein the field boundary polygon is segmented into a plurality of segments, the plurality of segments including a headland polygon defining a shape and a size of the headland and a work partition polygon defining a shape and a size of the work partition;
   identify a segment of a boundary of the headland polygon that is shared in common with a field edge boundary of the field boundary polygon;
   generate, by trimming the identified segment on at least one end based on a defined lateral trim buffer width, a seed track based on a shape of at least a portion of the identified segment;
   define a plurality of guidance tracks for the headland by replicating the seed track at a defined spacing throughout the headland polygon, wherein each guidance track is indicative of a path to be followed by the agricultural machine while performing the work task in the headland of the agricultural field;
   generate headland work plans for each of one or more headland candidate polygons having an area exceeding a minimum headland area threshold, wherein the one or more headland candidate polygons includes the headland polygon; and
   based on a predefined geospatial position of the agricultural machine and the generated work plan, transmit one or more control signals to a steering system of the agricultural machine in order to direct the agricultural machine along a guidance track of the plurality of guidance tracks.

2. The system of claim 1, wherein the electronic controller is further configured to facilitate operation of the agricultural machine in accordance with the generated work plan.

3. The system of claim 1, wherein the electronic controller is configured to facilitate operation of the agricultural machine in accordance with the generated work plan by
   monitoring the geospatial position of the agricultural machine while performing the work task in the headland,
   displaying on a user interface display screen a graphical representation of the generated work plan including a graphical representation of at least a portion of the plurality of guidance tracks, and
   displaying on the user interface a graphical indication of the geospatial position of the agricultural machine relative to the displayed guidance tracks.

4. The system of claim 1, wherein the electronic controller is configured to define the plurality of guidance tracks by
   positioning a first copy of the seed track at a first defined distance from the corresponding segment of the boundary of the headland polygon,
   positioning a second copy of the seed track at a second defined distance from the first copy of the seed track, and
   positioning a third copy of the seed track at the second defined distance from the second copy of the seed track.

5. The system of claim 4, wherein each guidance track of the plurality of guidance tracks is indicative of a sequence of target positions for a center of an implement used by the agricultural machine in performing the work task, wherein the second defined distance is based at least in part on an operating width of the implement, and wherein the first defined distance is based at least in part on half of the operating width of the implement.

6. The system of claim 1, wherein the electronic controller is configured to generate the seed track by:
   defining a guidance line with a shape and a size corresponding to an entire length of the boundary of the headland polygon that is shared in common with the field edge boundary of the field boundary polygon, and
   trimming the guidance line on both ends based on the defined lateral trim buffer width such that a left end point of the trimmed guidance line corresponds to a closest point along the guidance line to a left end of the guidance line that is laterally offset from the left end of the guidance line by the defined lateral trim buffer width and a right end point of the trimmed guidance line corresponds to a closest point along the guidance line to a right end of the guidance line that is laterally offset from the right end of the guidance line by the defined lateral trim buffer width.

7. The system of claim 6, wherein the electronic controller is configured to generate the seed track further by extending both ends of the guidance line such that a lateral width of the extended guidance line exceeds a maximum lateral width of the headland polygon, wherein the seed track includes the extended guidance line.

8. The system of claim 7, wherein the electronic controller is configured to define the plurality of guidance tracks for the headland by trimming any portion of a replicated seed track that extends beyond the boundary of the headland polygon.

9. The system of claim 1, wherein the electronic controller is further configured to:
   define the work partition polygon based on a work partition work plan, wherein the work partition polygon does not include areas of the agricultural field where the agricultural machine performs edge turns for the work partition work plan, and
   define the one or more headland candidate polygons including all portions of the field boundary polygon that are not included in the work partition polygon.

10. The system of claim 9, wherein the electronic controller is further configured to:
    compare each of the one or more headland candidate polygons to the minimum headland area threshold.

11. The system of claim 1, wherein the electronic controller is further configured to define the headland polygon by
    identifying a base line of the field boundary polygon; and
    defining the headland polygon as including all portions of the field boundary polygon that are within a defined base line offset distance of the identified base line of the field boundary polygon.

12. The system of claim 11, wherein the defined base line offset distance is determined based on at least one selected from a group consisting of
    a user-defined offset value,
    a turning radius of the agricultural machine, an operating width of an implement used by the agricultural machine in performing the work task, wherein the operating width of the implement is a first operating parameter of the agricultural machine, and
a second operating parameter of the agricultural machine not the same as the first operating parameter.

13. The system of claim 1, wherein the electronic controller is further configured to define the headland polygon by
identifying a base line of the field boundary polygon;
replicating the base line at a defined shift offset distance from the base line; and
defining the headland polygon based on an area of the field boundary polygon located between the base line and the replicated, shifted base line.

14. The system of claim 1, wherein the electronic controller is further configured to define the headland polygon by
determining an initial work partition polygon and an initial headland polygon,
increasing a lateral width of the initial work partition polygon relative to the initial headland polygon by a defined lateral buffer amount, and
defining the headland polygon based on an area of the initial headland polygon that is not occupied by the laterally increased work partition polygon.

15. The system of claim 1, wherein the electronic controller is further configured to:
identify a pinch point in the headland polygon,
further segment the headland polygon into a first headland polygon and a second headland polygon based on the identified pinch point, and
define a first work plan for the first headland polygon and define a second work plan for the second headland polygon.

16. The system of claim 15, wherein the electronic controller is configured to identify the pinch point in the headland polygon by
identifying a work partition boundary edge of the headland polygon that is shared in common with a boundary of the work partition polygon, and
detecting a point on the work partition boundary edge that is less than a defined minimum distance from any point on the identified segment of the boundary of the headland polygon that is shared in common with the field edge boundary of the field boundary polygon.

17. The system of claim 15, wherein the electronic controller is configured to identify the pinch point in the headland polygon by detecting a location where an interior portion of a copy of the seed track is positioned within the work partition polygon, wherein the interior portion of the copy of the seed track is between two segments along the length of the copy of the seed track that are both positioned within the headland polygon.

18. A method of generating and at least partially implementing a work plan for a headland of an agricultural field, the headland positioned adjacent to a work partition of the agricultural field and is used by an agricultural machine to perform edge turns while performing a work task in the work partition of the agricultural field, the method comprising:
determining a field boundary polygon indicative of a workable area of the agricultural field, wherein the field boundary polygon is segmented into a plurality of segments, the plurality of segments including a headland polygon defining a shape and a size of the headland and a work partition polygon defining a shape and a size of the work partition;
identifying a segment of a boundary of the headland polygon that is shared in common with a field edge boundary of the field boundary polygon;
generating, by trimming the identified segment on at least one end based on a defined lateral trim buffer width, a seed track based on a shape of at least a portion of the identified segment;
defining a plurality of guidance tracks for the headland by replicating the seed track at a defined spacing throughout the headland polygon, wherein each guidance track is indicative of a path to be followed by the agricultural machine while performing the work task in the headland of the agricultural field;
generating headland work plans for each of one or more headland candidate polygons with an area exceeding a minimum headland area threshold, wherein the one or more headland candidate polygons includes the headland polygon; and
transmitting, based on a predefined geospatial position of the agricultural machine and the generated work plan, one or more control signals to a steering system of the agricultural machine in order to direct the agricultural machine along a guidance track of the plurality of guidance tracks.

19. A system for operating an agricultural machine to perform a work task on an agricultural field, the system comprising one or more electronic controllers configured to:
determine a field boundary polygon indicative of a workable area of the agricultural field;
segment the field boundary polygon into a plurality of work area polygons including a work partition polygon, a top headland polygon, and a bottom headland polygon, wherein the top headland polygon and the bottom headland polygon are positioned on opposite sides of the work partition polygon;
define a work plan for the work partition polygon, wherein the work plan for the work partition polygon includes a first plurality of work partition guidance tracks each indicative of a path to be followed by the agricultural machine while performing the work task in a portion of the agricultural field corresponding to the work partition polygon;
define a work plan for the top headland polygon by
identifying a segment of a boundary of the top headland polygon that includes an entire portion of the boundary of the top headland polygon that is shared in common with a field edge boundary of the field boundary polygon,
generating a top headland seed track by trimming the segment of the boundary of the top headland polygon on both ends based on a defined lateral trim buffer width,
extending the top headland seed track on both ends such that a total lateral width of the extended top headland seed track exceeds a maximum width of the top headland polygon, and
defining a plurality of top headland guidance tracks for the work plan for the top headland by replicating the extended top headland seed track at a defined spacing throughout the top headland polygon and trimming any portion of the replicated extended top headland seed tracks that extend beyond the boundary of the top headland polygon;
defining a work plan for the bottom headland polygon by
identifying a segment of a boundary of the bottom headland polygon that includes an entire portion of the boundary of the bottom headland polygon that is shared in common with the field edge boundary of the field boundary polygon, generating a bottom headland seed track by trimming the segment of the boundary of the bottom headland polygon on both ends based on a defined lateral trim buffer width, extending the bottom headland seed track on both ends such that a total length of the extended bottom headland seed track exceeds a maximum width of the bottom headland polygon, and defining a plurality of bottom headland guidance tracks for the work plan for the bottom headland by replicating the extended bottom headland seed track at the defined spacing throughout the bottom headland polygon and trimming any portion of the replicated extended bottom headland seed tracks that extend beyond the boundary of the bottom headland polygon; and operating the agricultural machine by transmitting control signals to a steering system of the agricultural machine to cause the agricultural machine to follow the work partition guidance tracks while performing the work task in the portion of the agricultural field corresponding to the work partition polygon, to follow the top headland guidance tracks while performing the work task in a portion of the agricultural field corresponding to the top headland polygon, and to follow the bottom headland guidance tracks while performing the work task in a portion of the agricultural field corresponding to the bottom headland polygon, wherein the agricultural machine performs edge turns within the portion of the agricultural field corresponding to the top headland polygon or within the portion of the agricultural field corresponding to the bottom headland polygon while transitioning from one work partition guidance track to another work partition guidance track.

20. A system for operating an agricultural machine to perform a work task on an agricultural field, the system comprising one or more electronic controllers configured to:

determine a field boundary polygon indicative of a workable area of the agricultural field;

segment the field boundary polygon into a plurality of work area polygons including a work partition polygon and at least one of a top headland polygon or a bottom headland polygon;

define a work plan for the work partition polygon, wherein the work plan for the work partition polygon includes a first plurality of work partition guidance tracks each indicative of a path to be followed by the agricultural machine while performing the work task in a portion of the agricultural field corresponding to the work partition polygon;

define a work plan for a top headland polygon of the at least one of the top headland polygon or the bottom headland polygon by identifying a segment of a boundary of the top headland polygon that includes an entire portion of the boundary of the top headland polygon that is shared in common with a field edge boundary of the field boundary polygon, generating a top headland seed track by trimming the segment of the boundary of the top headland polygon on at least one end based on a defined lateral trim buffer width, extending the top headland seed track on at least one end such that a total lateral width of the extended top headland seed track exceeds a maximum width of the top headland polygon, and based on the boundary of the top headland polygon, defining a plurality of top headland guidance tracks for the work plan for the top headland by replicating the extended top headland seed track at a defined spacing throughout the top headland polygon; and operating the agricultural machine by transmitting control signals to a steering system of the agricultural machine to cause the agricultural machine to follow the work partition guidance tracks while performing the work task in the portion of the agricultural field corresponding to the work partition polygon and to follow the top headland guidance tracks while performing the work task in a portion of the agricultural field corresponding to the top headland polygon.

21. A system for operating an agricultural machine to perform a work task on an agricultural field, the system comprising one or more electronic controllers configured to:

determine a field boundary polygon indicative of a workable area of the agricultural field;

segment the field boundary polygon into a plurality of work area polygons including a work partition polygon and a headland polygon;

define a work plan for the work partition polygon, wherein the work plan for the work partition polygon includes a first plurality of work partition guidance tracks each indicative of a path to be followed by the agricultural machine while performing the work task in a portion of the agricultural field corresponding to the work partition polygon; and define a work plan for the headland polygon by identifying a segment of a boundary of the headland polygon that is shared in common with a field edge boundary of the field boundary polygon, generating a headland seed track by trimming the identified segment of the boundary of the headland polygon based on a defined lateral trim buffer width, and defining a plurality of headland guidance tracks for the work plan for the headland by replicating the headland seed track at a defined spacing throughout the headland polygon and trimming any portion of the replicated headland seed tracks based on the boundary of the headland polygon; and transmitting one or more control signals to a steering system of the agricultural machine in order to direct the agricultural machine to along a work partition guidance track of the first plurality of work partition guidance tracks or a headland guidance track of the plurality of headland guidance tracks.

* * * * *